US012749451B2

(12) United States Patent
Bong

(10) Patent No.: US 12,749,451 B2
(45) Date of Patent: Sep. 29, 2026

(54) GATE DRIVER AND DISPLAY DEVICE INCLUDING THE SAME

(71) Applicant: LG Display Co., Ltd., Seoul (KR)

(72) Inventor: Junho Bong, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/948,061

(22) Filed: Nov. 14, 2024

(65) Prior Publication Data

US 2025/0273159 A1 Aug. 28, 2025

(30) Foreign Application Priority Data

Feb. 23, 2024 (KR) ........................ 10-2024-0026476

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2340/0435* (2013.01)

(58) Field of Classification Search
CPC ............. G09G 2310/08; G09G 3/3233; G09G 2300/0861; G09G 3/3266
See application file for complete search history.

(56) References Cited

U.S. PATENT DOCUMENTS

| | | | | |
|---|---|---|---|---|
| 12,033,583 B2 * | 7/2024 | Kim | ..................... | G09G 3/3266 |
| 2023/0044555 A1 * | 2/2023 | Bong | ..................... | G09G 3/3266 |
| 2025/0218391 A1 * | 7/2025 | Kim | ..................... | G09G 3/3291 |
| 2025/0218394 A1 * | 7/2025 | Bong | ..................... | G09G 3/3266 |
| 2025/0239224 A1 * | 7/2025 | Kim | ..................... | G09G 3/3233 |

FOREIGN PATENT DOCUMENTS

KR 10-2022-0093764 A 7/2022

* cited by examiner

*Primary Examiner* — Van N Chow
(74) *Attorney, Agent, or Firm* — Seed Intellectual Property Law Group LLP

(57) ABSTRACT

The present disclosure relates to gate driver and display device including the same. According to an aspect of the present disclosure, a gate driver includes: a plurality of stages which is dependently connected to each other, each of the plurality of stages includes: a node controller configured to control voltages of a Q node, a Q1 node, a Q2 node, a QB node, a QB1 node, and a QB2 node based on a first clock signal and a second clock signal; a carry signal output unit configured to output a carry signal to a next stage based on the voltages of the Q1 node and the QB1 node; and a scan signal output unit configured to output a scan signal to a scan line based on the voltages of the Q node and the QB node, and a width of the scan signal may be determined by a toggling timing of the first clock signal and a toggling timing of the second clock signal.

18 Claims, 11 Drawing Sheets

GATE DRIVER AND DISPLAY DEVICE INCLUDING THE SAME

CROSS-REFERENCE TO RELATED APPLICATIONS

This application claims the priority of Korean Patent Application No. 10-2024-0026476 filed on Feb. 23, 2024, in the Korean Intellectual Property Office, the disclosure of which is incorporated herein by reference.

BACKGROUND

Technical Field

The present disclosure relates to a gate driver and a display device including the same.

Description of the Related Art

As it enters an information era, a display field which visually expresses electrical information signals has been rapidly developed, and in response to this, various display devices having excellent performances such as thin-thickness, light weight, and low power consumption have been developed. Examples of such a display device include a liquid crystal display (LCD) device, an organic light emitting display (OLED) device, and the like.

Such a display device includes a display panel in which pixel arrays for displaying images are disposed and a driving circuit, such as a data driver, a gate driver, and a timing controller. The data driver supplies a data signal to data lines disposed in the display panel, the gate driver sequentially supplies a gate signal to gate lines disposed in the active area, and the timing controller controls the data driver and the gate driver.

BRIEF SUMMARY

The present disclosure provides a gate driver which drives an n-type transistor and a display device including the same.

The present disclosure provides a gate driver which modifies a driving timing of a scan signal in various ways and a display device including the same.

Technical features of the present disclosure are not limited to the above-mentioned features, and other features, which are not mentioned above, can be clearly understood by those skilled in the art from the following descriptions.

According to an aspect of the present disclosure, a gate driver includes: a plurality of stages which is dependently connected to each other, each of the plurality of stages includes: a node controller configured to control voltages of a Q node, a Q1 node, a Q2 node, a QB node, a QB1 node, and a QB2 node based on a first clock signal and a second clock signal; a carry signal output unit configured to output a carry signal to a next stage based on the voltages of the Q1 node and the QB1 node; and a scan signal output unit configured to output a scan signal to a scan line based on the voltages of the Q node and the QB node, and a width of the scan signal may be determined by a toggling timing of the first clock signal and a toggling timing of the second clock signal.

According to an aspect of the present disclosure, a display device includes a display panel including an active area in which a plurality of pixels is disposed; and a gate driver including a plurality of stages which is dependently connected to each other, each of the plurality of stages includes: a node controller configured to control voltages of a Q node, a Q1 node, a Q2 node, a QB node, a QB1 node, and a QB2 node based on a first clock signal and a second clock signal; a carry signal output unit configured to output a carry signal to a next stage based on the voltages of the Q1 node and the QB1 node; and a scan signal output unit configured to output a scan signal to a scan line based on the voltages of the Q node and the QB node, and a width of the scan signal may be determined by a toggling timing of the first clock signal and a toggling timing of the second clock signal.

Other detailed matters of the example embodiments are included in the detailed description and the drawings.

According to the present disclosure, a pulse width of the scan signal may be set to be 1 H (horizontal period) or shorter so that the scan signal can be set in accordance with various driving timings.

According to the present disclosure, a stability of scan signal output is improved to improve a driving reliability of the display device.

According to the present disclosure, a high level of gate-on level scan signal is output to drive a transistor including an n-type oxide semiconductor in a plurality of pixels.

According to the present disclosure, a separate power line for driving an inverter is not necessary so that a bezel area may be reduced and the increase in separate power consumption may be suppressed.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
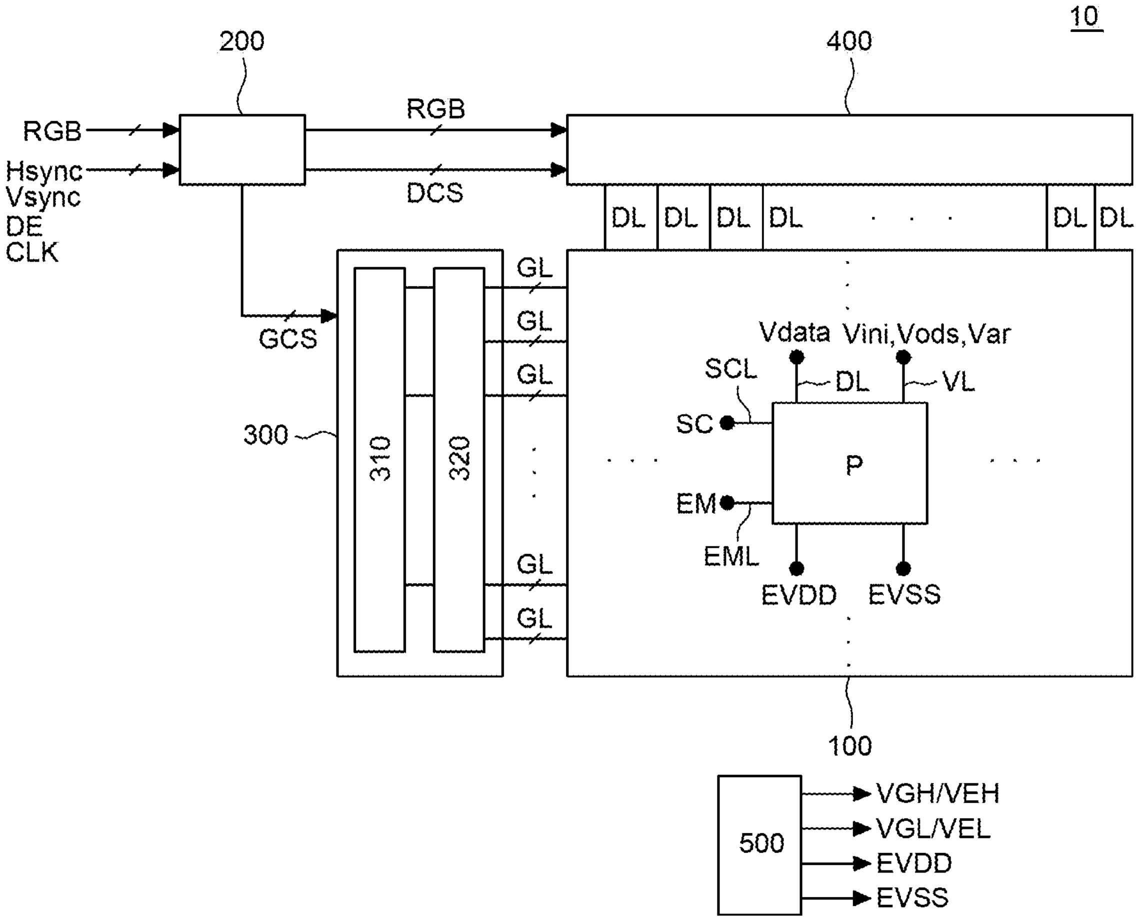
FIG. 1 is a block diagram illustrating a display device according to an embodiment of the present disclosure.

Technical features and characteristics of the present disclosure and a method of achieving the technical features and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on,” “above,” “below,” and “next,” one or more parts may be positioned between the two parts unless the terms are used with the term “immediately” or “directly.”

When an element or layer is disposed “on” another element or layer, another layer or another element may be interposed directly on the other element or therebetween.

Although the terms “first,” “second,” and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to example embodiments of the present disclosure will be described in detail with reference to accompanying drawings.

FIG. 1 is a block diagram schematically illustrating a display device according to an example embodiment of the present disclosure.

Referring to FIG. 1, the display device 10 includes a display panel 100 including a plurality of pixels P, a controller 200, a gate driver 300 which supplies a gate signal to each of the plurality of pixels P, a data driver 400 which supplies a data signal to each of the plurality of pixels P, and a power supply unit 500. The power supply unit 500 supplies a power required for driving to each of the plurality of pixels P.

The display panel 100 includes an active area AA (see FIG. 2) in which the pixel P is located and a non-active area NA (see FIG. 2) which is disposed so as to enclose the active area AA and includes the gate driver 300 and the data driver 400.

In the display panel 100, the plurality of gate lines GL and the plurality of data lines DL intersect each other and the plurality of pixels P is connected to the gate lines GL and the data lines DL, respectively. Specifically, one pixel P is supplied with a gate signal from the gate driver 300 through the gate line GL, is supplied with a data signal from the data driver 400 through the data line DL, and is supplied with a high potential driving voltage EVDD and a low potential driving voltage EVSS from the power supply unit 500.

Here, the gate line GL supplies a scan signal SC and an emission control signal EM and the data line DL supplies a data voltage Vdata. Further, according to various example embodiments, the gate line GL may include a plurality of gate lines SCL which supplies a scan signal SC and an emission control signal line EML which supplies the emission control signal EM. Further, the plurality of pixels P further includes a power line VL to be supplied with a bias voltage Vobs and initialization voltages Var and Vini.

Figure 2:
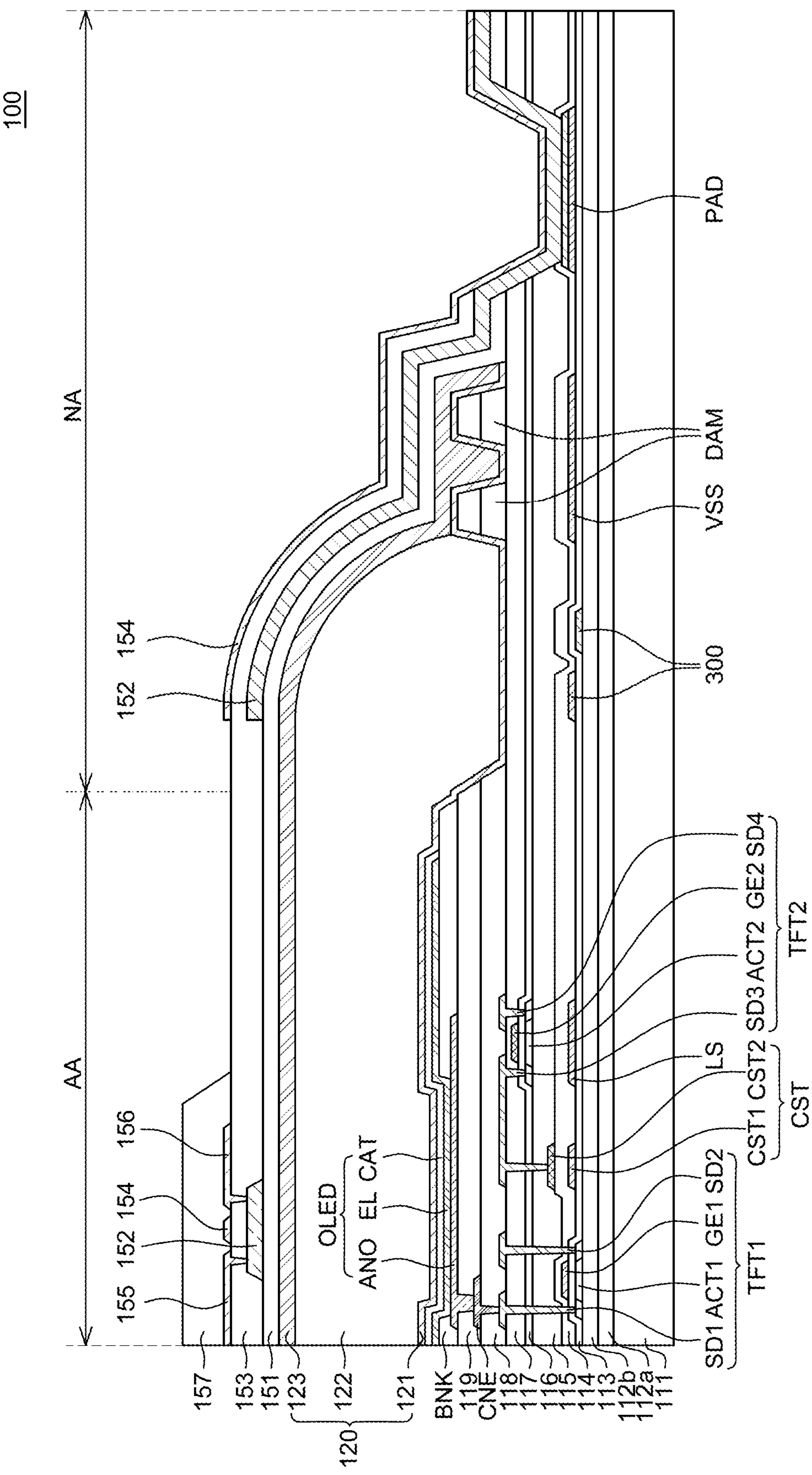
FIG. 2 is a cross-sectional view illustrating a lamination shape of a display device according to an example embodiment.

Further, each pixel P includes a light emitting diode OLED and a pixel circuit configured to control the driving of the light emitting diode OLED, as illustrated in FIG. 2. Here, the light emitting diode OLED is configured by an anode electrode ANO, a cathode electrode CAT, and an emission layer EL between the anode electrode ANO and the cathode electrode CAT.

The pixel circuit includes a plurality of switching elements, a driving element, and a capacitor. Here, the switching element and the driving element may be configured by thin film transistors. In the pixel circuit, the driving element controls an amount of currents to be supplied to the light emitting diode OLED in accordance with the data voltage to adjust an emission amount of the light emitting diode OLED. Further, the plurality of switching elements receives a scan signal SC supplied through the plurality of gate lines SCL and an emission control signal EM supplied through the emission control line EML to operate the pixel circuit.

The display panel 100 may be implemented as a non-transmissive display panel or a transmissive display panel. The transmissive display panel may be applied to a transparent display device in which an image is displayed on a screen and real objects in the background are visible. The display panel 100 may be manufactured as a flexible display panel. The flexible display panel may be implemented by an OLED panel which uses a plastic substrate.

Each pixel P may be divided into a red pixel, a green pixel, and a blue pixel to implement colors. Each pixel P may further include a white pixel. Each pixel P includes a pixel circuit.

Touch sensors may be disposed on the display panel 100. The touch input may be sensed using separate touch sensors or sensed by pixels P. The touch sensors may be disposed on the screen of the display panel in an on-cell type or an add-on type or implemented as in-cell type touch sensors to be embedded in the display panel 100.

The controller 200 processes image data RGB input from the outside to be suitable for a size and a resolution of the display panel 100 to supply the processed image data to the data driver 400. The controller 200 generates a gate control signal GCS and a data control signal DCS using synchronization signals input from the outside, for example, a dot clock signal CLK, a data enable signal DE, a horizontal synchronization signal Hsync, and a vertical synchronization signal Vsync. The generated gate control signal GCS and data control signal DCS are supplied to the gate driver 300 and the data driver 400, respectively, to control the gate driver 300 and the data driver 400.

The controller 200 may be configured to be coupled with various processors such as a microprocessor, a mobile processor, or an application processor, depending on a device to be mounted.

A host system may be any one of a television (TV) system, a set top box, a navigation system, a personal computer (PC), a home theater system, a mobile device, a wearable device, and a vehicle system.

The controller 200 multiples an input frame frequency by i and may control an operating timing of a display panel driver with a frame frequency of an input frame frequency x i (i is a positive integer larger than 0) Hz. The input frame frequency is 60 Hz in a national television standards committee (NTSC) standard and is 50 Hz in a phase-alternating line (PAL) standard.

The controller 200 generates a signal to allow the pixel P to be driven at various refresh rates. That is, the controller 200 generates signals associated with the driving to allow the pixel P to be driven in a variable refresh rate (VRR) mode or to be switchable between a first refresh rate and a second refresh rate. For example, the controller 200 may drive the pixel P at various refresh rates by simply changing a rate of a clock signal, or generating a synchronization signal to generate a horizontal blank or a vertical blank, or driving the gate driver 300 in a mask manner.

The controller 200 generates a gate control signal GCS for controlling an operating timing of the gate driver 300 and a data control signal DCS for controlling an operating timing of the data driver 400 based on timing signals Vsync, Hsync, and DE received from the host system. The controller 200 controls the operating timing of the display panel driver to synchronize the gate driver 300 and the data driver 400.

A voltage level of the gate control signal GCS output from the controller 200 is converted into gate-on voltages VGL and VEL and gate-off voltages VGH and VEH through a level shifter which is not illustrated to be supplied to the gate driver 300. The level shifter converts a low level voltage of the gate control signal GCS into the gate low voltage VGL and converts a high level voltage of the gate control signal GCS into a gate high voltage VGH. The gate control signal GCS includes a start pulse and a shift clock.

The gate driver 300 supplies the scan signals SC to the gate lines GL in accordance with the gate control signal GCS supplied from the controller 200. The gate driver 300 may be disposed at one side or both sides of the display panel 100 in a gate in panel (GIP) manner.

The gate driver 300 sequentially outputs the gate signals to the plurality of gate lines GL under the control of the controller 200. The gate driver 300 shifts the gate signal using a shift register to sequentially supply the signals to the gate lines GL.

The gate signal may include a scan signal SC and an emission control signal EM in the organic light emitting display device. The scan signal SC includes a scan pulse swinging between the gate-on voltage VGL and the gate-off voltage VGH. The emission control signal EM may include an emission control signal pulse swinging between the gate-on voltage VGL and the gate-off voltage VGH.

The scan pulse is synchronized with the data voltage Vdata to select the pixels P of a line in which the data is written. The emission control signal EM defines an emission time of the pixels P.

The gate driver 300 may include an emission control signal driver 310 and at least one or more scan drivers 320.

The emission control signal driver 310 outputs an emission control signal pulse in response to a start pulse and a shift clock from the controller 200 and sequentially shifts the emission control signal pulse in accordance with a shift clock.

At least one or more scan drivers 320 output the scan pulse in response to a start pulse and a shift clock from the controller 200 and shift a scan pulse in accordance with the shift clock timing.

The data driver 400 converts image data RGB into a data voltage Vdata in accordance with the data control signal DCS supplied from the controller 200 and supplies the converted data voltage Vdata to the pixel P through the data line DL.

Even though in FIG. 1, it is illustrated that one data driver 400 is disposed at one side of the display panel 100, the number of the data drivers 400 and a placement position thereof are not limited thereto.

That is, the data driver 400 is configured by a plurality of integrated circuits IC to be divided into a plurality of parts at one side of the display panel 100.

The power supply unit 500 generates a DC power required to drive the pixel array of the display panel 100 and the display panel driver using a DC-DC converter. The DC-DC converter may include a charge pump, a regulator, a buck converter, a boost converter, and the like. The power supply unit 500 receives a DC input voltage applied from the host system which is not illustrated to generate a DC voltage, such as a gate-on voltage VGL, VEL, a gate-off voltage VGH, VEH, a high potential driving voltage EVDD, and a low potential driving voltage EVSS. The gate-on voltage VGL, VEL and the gate-off voltage VGH, VEH are supplied to the level shifter which is not illustrated and the gate driver 300. The high potential driving voltage EVDD and the low potential driving voltage EVSS are commonly supplied to the pixels P.

FIG. 2 is a cross-sectional view illustrating a lamination shape of a display device according to an example embodiment.

Referring to FIG. 2, FIG. 2 is a cross-sectional view including two switching thin film transistors TFT1 and TFT2 and one storage capacitor CST. Two thin film transistors TFT1 and TFT2 include any one thin film transistor of a switching thin film transistor or a driving transistor including a polycrystalline semiconductor material, and an oxide thin film transistor TFT2 including an oxide semiconductor material. In this case, the thin film transistor including the polycrystalline semiconductor material is referred to as a polycrystalline thin film transistor TFT1 and the thin film transistor including the oxide semiconductor material is referred to as an oxide thin film transistor TFT2.

The polycrystalline thin film transistor TFT1 illustrated in FIG. 2 is an emission switching thin film transistor connected to the light emitting diode OLED and the oxide thin film transistor TFT2 is any one switching thin film transistor connected to the storage capacitor CST.

One pixel P includes the light emitting diode OLED and a pixel driving circuit which applies a driving current to the light emitting diode OLED. The pixel driving circuit is disposed on the substrate 111 and the light emitting diode OLED is disposed on the pixel driving circuit. An encapsulation layer 120 is disposed on the light emitting diode OLED. The encapsulation layer 120 protects the light emitting diode OLED.

The pixel driving circuit may refer to one pixel (P) array unit including a driving thin film transistor, a switching thin film transistor, and a capacitor. The light emitting diode OLED may refer to an array unit which includes an anode electrode and a cathode electrode and an emission layer disposed therebetween to emit light.

In one example embodiment, the driving thin film transistor and at least one switching thin film transistor use the oxide semiconductors as active layers. The thin film transistor which uses the oxide semiconductor material as an active layer has an excellent leakage current blocking effect and has a manufacturing cost which is cheaper than a thin film transistor which uses a polycrystalline semiconductor material as an active layer. Accordingly, in order to reduce the power consumption and save the manufacturing cost, the pixel driving circuit according to the example embodiment includes a driving thin film transistor and at least one switching thin film transistor which use the oxide semiconductor material.

All the thin film transistors which configure the pixel driving circuit may be implemented using the oxide semiconductor material or only some switching thin film transistors may be implemented using the oxide semiconductor material.

However, it is difficult to ensure the reliability with the thin film transistor using the oxide semiconductor material, but the thin film transistor using a polycrystalline semiconductor material has a rapid operation speed and excellent reliability. Accordingly, the example embodiment includes both the switching thin film transistor using the oxide semiconductor material and the switching thin film transistor using a polycrystalline semiconductor material.

The substrate 111 may be configured as a multi-layer in which an organic film and an inorganic film are alternately laminated. For example, in the substrate 111, an organic film such as polyimide and an inorganic film such as silicon oxide ($SiO_2$) may be alternately laminated.

A lower buffer layer 112*a* is disposed on the substrate 111. The lower buffer layer 112*a* is provided to block moisture, etc., penetrating from the outside and may be used by laminating a plurality of silicon oxide ($SiO_2$) films. An auxiliary buffer layer 112*b* may be further disposed on the lower buffer layer 112*a* to protect the element from the moisture permeation.

The polycrystalline thin film transistor TFT1 is formed on the substrate 111. The polycrystalline thin film transistor TFT1 may use the polycrystalline semiconductor as an active layer. The polycrystalline thin film transistor TFT1 includes a first active layer ACT1 including a channel through which electrons or holes move, a first gate electrode GE1, a first source electrode SD1, and a first drain electrode SD2.

The first active layer ACT1 includes a first channel area, a first source area which is disposed on one side of the first channel area and a first drain area disposed on the other side. The first source area and the first drain area are disposed with the first channel area therebetween.

The first source area and the first drain area are areas in which an intrinsic polycrystalline semiconductor material is doped with group 5 or group 3 impurity ions, for example, phosphorus (P) or boron (B) at a predetermined concentration to be conductive. In the first channel area, the polycrystalline semiconductor material maintains an intrinsic state and a path through which the electrons or holes move is provided.

In the meantime, the polycrystalline thin film transistor TFT1 includes a first gate electrode GE1 which overlaps the first channel area of the first active area ACT1. A first gate insulating layer 113 is disposed between the first gate electrode GE1 and the first active layer ACT1. The first gate insulating layer 113 may be used by laminating inorganic layers, such as a silicon oxide (SiO2) film or silicon nitride (SiNx) as a single layer or multiple layers.

In the example embodiment, the polycrystalline thin film transistor TFT1 has a top gate structure in which the first gate electrode GE1 is located above the first active layer ACT1. Accordingly, a first electrode CST1 included in a storage capacitor CST and a light shielding layer LS included in the oxide thin film transistor TFT2 may be formed with the same material as the first gate electrode GE1. The first gate electrode GE1, the first electrode CST1, and the light shielding layer LS are formed by one mask process so that the number of mask processes may be reduced.

The first gate electrode GE1 is configured by a metal material. For example, the first gate electrode GE1 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

A first interlayer insulating layer 114 is disposed on the first gate electrode GE1. The first interlayer insulating layer 114 may be configured by silicon oxide (SiO2) or silicon nitride (SiNx).

The display panel 100 may further include an upper buffer layer 115, a second gate insulating layer 116, and a second interlayer insulating layer 117 which are sequentially disposed on the first interlayer insulating layer 114. The polycrystalline thin film transistor TFT1 includes the first source electrode SD1 and the first drain electrode SD2 which are formed on the second interlayer insulating layer 117 and are connected to the first source region and the first drain region, respectively.

The first source electrode SD1 and the first drain electrode SD2 may be formed of a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but are not limited thereto.

The upper buffer layer 115 separates the second active layer ACT2 of the oxide thin film transistor TFT2 implemented by an oxide semiconductor material from the first active layer ACT1 implemented by a polycrystalline semiconductor material and provides a base for forming the second active layer ACT2.

The second gate insulating layer 116 covers the second active layer ACT2 of the oxide thin film transistor TFT2. The second gate insulating layer 116 is formed on the second active layer ACT2 implemented by the oxide semiconductor material so that the second gate insulating layer is implemented by an inorganic film. For example, the second gate insulating layer 116 may be silicon oxide SiO2 or silicon nitride SiNx.

The second gate electrode GE2 is configured by a metal material. For example, the second gate electrode GE2 may be a single layer or multiple layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

In the meantime, the oxide thin film transistor TFT2 includes a second active layer ACT2 which is formed on the upper buffer layer 115 and is implemented by an oxide semiconductor material, a second gate electrode GE2 disposed on the second gate insulating layer 116, and a second source electrode SD3 and a second drain electrode SD4. The second source electrode SD3 and the second drain electrode SD4 are disposed on the second interlayer insulating layer 117.

The second active layer ACT2 includes an intrinsic second channel area which is implemented by the oxide semiconductor material and is not doped with an impurity and a second source area and a second drain area which are doped with an impurity to become conductive.

The oxide thin film transistor TFT2 further includes a light shielding layer LS which is located below the upper buffer layer 115 and overlaps the second active layer ACT2. The light shielding layer LS blocks light incident onto the second active layer ACT2 to ensure the reliability of the oxide thin film transistor TFT2. The light shielding layer LS is formed by the same material as the first gate electrode GE1 and may be formed on an upper surface of the first gate insulating film 113. The light shielding layer LS is electrically connected to the second gate electrode GE2 to configure a dual gate.

The second source electrode SD3 and the second drain electrode SD4 are simultaneously formed of the same material as the first source electrode SD1 and the first drain electrode SD2 on the second interlayer insulating layer 117 to reduce the number of mask processes.

In the meantime, a second electrode CST2 is disposed on the first interlayer insulating layer 114 so as to overlap the first electrode CST1 to implement the storage capacitor CST. For example, the second electrode CST2 may be a single layer or multiple layers formed of any one of molybdenum (Mo), aluminum (Al), chrome (Cr), gold (Au), titanium (Ti), nickel (Ni), neodymium (Nd), and copper (Cu), or an alloy thereof.

The storage capacitor CST stores a data voltage which is applied through the data line DL for a predetermined period and then supplies the data voltage to the light emitting diode OLED. The storage capacitor CST includes two corresponding electrodes and a dielectric material disposed therebetween. The first interlayer insulating layer 114 is located between the first electrode CST1 and the second electrode CST2.

The first electrode CST1 or the second electrode CST2 of the storage capacitor CST may be electrically connected to the second source electrode SD3 or the second drain electrode SD4 of the oxide thin film transistor TFT2. However, it is not limited thereto and a connection relationship of the storage capacitor CST may vary according to the pixel driving circuit.

In the meantime, a first planarization layer 118 and a second planarization layer 119 are sequentially disposed on the pixel driving circuit to planarize an upper end of the pixel driving circuit. The first planarization layer 118 and the second planarization layer 119 may be organic films, such as polyimide or acryl resin.

The light emitting diode OLED is formed on the second planarization layer 119.

The light emitting diode OLED includes an anode electrode ANO, a cathode electrode CAT, and an emission layer EL disposed between the anode electrode ANO and the cathode electrode CAT. If a pixel driving circuit which commonly uses a low potential voltage connected to the cathode electrode CAT is implemented, the anode electrode ANO is disposed as a separate electrode in every sub pixel. If a pixel driving circuit which commonly uses a high potential voltage is implemented, the cathode electrode CAT may be disposed as a separate electrode in every sub pixel.

The light emitting diode OLED is electrically connected to the driving element through an intermediate electrode CNE disposed on the first planarization layer 118. Specifically, the anode electrode ANO of the light emitting diode OLED and the first source electrode SD1 of the polycrystalline thin film transistor TFT1 which configures the pixel driving circuit are connected to each other by the intermediate electrode CNE.

The anode electrode ANO is connected to the intermediate electrode CNE exposed through the contact hole which passes through the second planarization layer 119. Further, the intermediate electrode CNE is connected to the first source electrode SD1 exposed through the contact hole which passes through the first planarization layer 118.

The intermediate electrode CNE serves as a medium connecting the first source electrode SD1 and the anode electrode ANO. The intermediate electrode CNE may be formed of a conductive material, such as copper (Cu), silver (Ag), molybdenum (Mo), or titanium (Ti).

The anode electrode ANO may be formed to have a multi-layered structure including a transparent conductive film and an opaque conductive film having high reflection efficiency. The transparent conductive film is configured with a material having a relatively high work function, such as indium-tin-oxide (ITO) or indium-zinc-oxide (IZO). The opaque conductive film may be configured as a single or multilayered structure including aluminum (Al), silver (Ag), copper (Cu), lead (Pb), molybdenum (Mo), titanium (Ti), or an alloy thereof. For example, the anode electrode ANO may be formed with a structure in which a transparent conductive film, an opaque conductive film, and a transparent conductive film are sequentially laminated or may be formed with a structure in which a transparent conductive film and an opaque conductive film are sequentially laminated.

The emission layer EL may be formed by laminating a hole related layer, an organic emission layer, and an electron related layer on the anode electrode ANO in this order or in a reverse order.

A bank layer BNK may be a pixel definition film which exposes the anode electrode ANO of each pixel P. The bank layer BNK may be formed of an opaque material (for example, black) to suppress the light interference between adjacent pixels P. In this case, the bank layer BNK includes a light shielding material which is formed of at least any one of a color pigment, organic black, and carbon. A spacer may be further disposed on the bank layer BNK.

The cathode electrode CAT is formed on a top surface and a side surface of the emission layer EL so as to be opposite to the anode electrode ANO with the emission layer EL therebetween. The cathode electrode CAT may be integrally formed on the entire active area AA. When the cathode electrode CAT is applied to a top-emission type organic light emitting display device, the cathode electrode may be configured by a transparent conductive film, such as indium-tin-oxide (ITO) or indium-zinc-oxide (IZO).

The encapsulation layer 120 may be further disposed on the cathode electrode CAT to suppress moisture permeation.

The encapsulation layer 120 may block moisture or oxygen from being permeated into the light emitting diode OLED which is vulnerable to the moisture or oxygen from the outside. To this end, the encapsulation layer 120 may include at least one inorganic encapsulation layer and at least one organic encapsulation layer, but is not limited thereto. In the present disclosure, a structure of the encapsulation layer 120 in which a first encapsulation layer 121, a second encapsulation layer 122, and a third encapsulation layer 123 are sequentially laminated will be described as an example.

The first encapsulation layer 121 is formed on the substrate 111 on which the cathode electrode CAT is formed. The third encapsulation layer 123 is formed on the substrate 111 on which the second encapsulation layer 122 is formed and encloses a top surface, a bottom surface, and a side surface of the second encapsulation layer 122 together with the first encapsulation layer 121. The first encapsulation layer 121 and the third encapsulation layer 123 may minimize or suppress the permeation of external moisture or oxygen into the light emitting diode OLED. The first encapsulation layer 121 and the third encapsulation layer 123 may be formed of an inorganic insulating material on which low-temperature deposition is allowed, such as silicon nitride SiNx, silicon oxide SiOx, silicon oxynitride SiON, or aluminum oxide $Al_2O_3$. The first encapsulation layer 121 and the third encapsulation layer 123 are deposited under a low temperature atmosphere so that the damage of the light emitting diode OLED which is vulnerable to a high temperature atmosphere may be suppressed during the deposition process of the first encapsulation layer 121 and the third encapsulation layer 123.

The second encapsulation layer 122 serves as a buffer which alleviates stress between layers due to the bending of the display device 10 and may planarize the step between layers. The second encapsulation layer 122 may be formed of acryl resin, epoxy resin, phenolic resin, polyamide resin, polyimide resin, and polyethylene or a nonphotosensitive organic insulating material such as silicon oxy carbon (SiOC), or a photosensitive organic insulating material such as photoacryl, on the substrate 111 on which the first encapsulation layer 121 is formed, but is not limited thereto. When the second encapsulation layer 122 is formed using an inkjet method, a dam DAM may be disposed to suppress a liquefied second encapsulation layer 122 from being diffused to an edge of the substrate 111. The dam DAM may be disposed to be closer to the edge of the substrate 111 than the second encapsulation layer 122. The dam DAM may suppress the second encapsulation layer 122 from being diffused into a pad region where a conductive pad disposed at an outermost periphery of the substrate 111 is disposed.

The dam DAM is designed to suppress the diffusion of the second encapsulation layer 122. However, when the second encapsulation layer 122 is formed to exceed a height of the dam DAM during the process, the second encapsulation layer 122 which is an organic layer may be exposed to the outside so that moisture, etc., may be easily permeated into the light emitting diode. Therefore, in order to avoid the above-mentioned problem, at least ten dams DAM may be repeatedly formed.

The dam DAM may be disposed on the second interlayer insulating layer 117 of the non-active area NA.

Further, the dam DAM may be simultaneously formed with the first planarization layer 118 and the second planarization layer 119. When the first planarization layer 118 is formed, a lower layer of the dam DAM is formed together and when the second planarization layer 119 is formed, an upper layer of the dam DAM is formed together so that the dam DAM may be laminated to have a double-layered structure.

Therefore, the dam DAM may be configured with the same material as the first planarization layer 118 and the second planarization layer 119, but is not limited thereto.

The dam DAM may be disposed to overlap a low potential driving power line VSS. For example, on a lower layer of a region of the non-display area NA where the dam DAM is located, the low potential driving power line VSS may be formed.

The low potential driving power line VSS and the gate driver 300 configured in a gate-in-panel (GIP) manner are formed to enclose the outer periphery of the display panel and the low potential driving power line VSS may be located at the outer periphery more than the gate driver 300. Further, the low potential driving power line VSS is connected to the cathode electrode CAT to apply a common voltage. Even though the gate driver 300 is simply illustrated in a plan view and a cross-sectional view, the gate driver 300 may be configured using a thin film transistor having the same structure as the thin film transistor of the active area AA.

The low potential driving power line VSS is disposed at the outside more than the gate driver 300. The low potential driving power line VSS is disposed at the outside more than the gate driver 300 and encloses the active area AA. For example, the low potential driving power line VSS may be formed of the same material as the first gate electrode GE1, but is not limited thereto and may be formed of the same material as the second electrode CST2 or the first source and drain electrodes SD1 and SD2, but is not limited thereto.

Further, the low potential driving power line VSS may be electrically connected to the cathode electrode CAT. The low potential driving power line VSS may supply a low potential driving voltage EVSS to the plurality of pixels P of the active area AA.

A touch layer may be disposed on the encapsulation layer 120. A touch buffer film 151 may be disposed between a touch sensor metal including touch electrode connection lines 152 and 154 and touch electrodes 155 and 156 and a cathode electrode CAT of the light emitting diode OLED on the touch layer.

The touch buffer film 151 may suppress the permeation of a chemical solution (a developer or an etchant) used for a manufacturing process of a touch sensor metal disposed on the touch buffer film 151 or moisture, etc., from the outside into the emission layer EL including an organic material. By doing this, the touch buffer film 151 may suppress the damage of the emission layer EL which is vulnerable to the chemical solution or the moisture.

The touch buffer film 151 may be formed of an organic insulating material which is formed at a temperature lower than a predetermined temperature (for example, 100° C.) to suppress the damage of the emission layer EL including an organic material which is vulnerable to a high temperature. The organic insulating material has a low permittivity of 1 to 3. For example, the touch buffer film 151 may be formed of an acrylic, epoxy, or siloxane-based material. The touch buffer film 151 which is formed of an organic insulating material and has a planarization performance may suppress a damage of the encapsulation layer 120 caused by the bending of the organic light emitting display device and the breakage of the touch sensor metal formed on the touch buffer film 151.

According to a mutual-capacitance-based touch sensor structure, the touch electrodes 155 and 156 are disposed on the touch buffer film 151 and the touch electrodes 155 and 156 may be alternately disposed.

The touch electrode connection lines 152 and 154 may electrically connect the touch electrodes 155 and 156. The touch electrode connection lines 152 and 154 and the touch electrodes 155 and 156 may be disposed on different layers with the touch insulating film 153 therebetween.

The touch electrode connection lines 152 and 154 are disposed to overlap the bank layer BNK to suppress the degradation of the aperture ratio.

In the meantime, in the touch electrodes 155 and 156, a part of the touch electrode connection line 152 passes through an upper portion and a side surface of the encapsulation layer 120 and an upper portion and a side surface of the dam DAM to be electrically connected to a touch driving circuit (not illustrated) through the touch pad PAD.

The above-described touch pad PAD may have a multi-layered structure in which the same layer as the first gate electrode GE1 and the same layer as the first source electrode SD1 and the first drain electrode SD2 are laminated, but is not limited thereto and the structure of the touch pad PAD may vary.

A part of the touch electrode connection lines 152 and 154 is supplied with a touch driving signal from the touch driving circuit to transmit the touch driving signal to the touch electrodes 155 and 156 and may transmit a touch sensing signal in the touch electrodes 155 and 156 to the touch driving circuit.

That is, a part of the touch electrode connection lines 152 and 154 disposed in the non-active area NA may have a double line structure to be disposed with the touch insulating film 153 therebetween.

A touch protection film 157 may be disposed on the touch electrodes 155 and 156. In the drawing, even though it is illustrated that the touch protection film 157 is disposed only on the touch electrodes 155 and 156, it is not limited thereto and the touch protection film 157 extends before and after the dam DAM to be disposed on the touch electrode connection line 152.

A color filter (not illustrated) may be further disposed on the encapsulation layer 120 and the color filter may be disposed on the touch layer or located between the encapsulation layer 120 and the touch layer.

Figure 3:
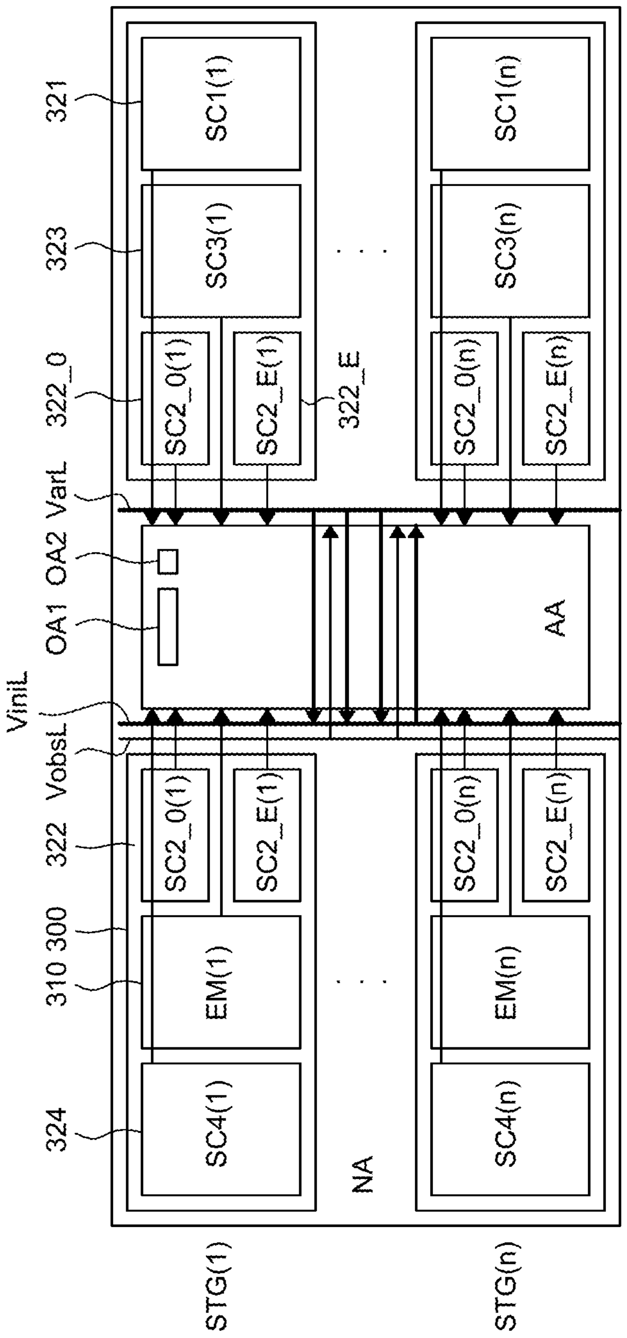
FIG. 3 is a view of a configuration of a gate driver in a display device according to an example embodiment of the present disclosure.

FIG. 3 is a view of a configuration of a gate driver in a display device according to an example embodiment of the present disclosure.

Referring to FIG. 3, the gate driver 300 is configured by an emission control signal driver 310 and a scan driver 320. The scan driver 320 may be configured by first to fourth scan drivers 321, 322, 323, and 324. Further, the second scan driver 322 may be configured by an odd-numbered second scan driver 322_O and an even-numbered second scan driver 322_E.

In the gate driver 300, shift registers may be symmetrically disposed on both sides of the active area AA. Further, in the gate driver 300, a shift register at one side of the active area AA includes second scan drivers 322_O and 322_E, a fourth scan driver 324, and an emission control signal driver 310, respectively. A shift register at the other side of the active area AA includes a first scan driver 321, second scan drivers 322_O and 322_E, and a third scan driver 323, respectively. However, the present disclosure is not limited thereto and the emission control signal driver 310 and the first to fourth scan drivers 321, 322, 323, and 324 may be disposed in different ways according to the example embodiments.

Each of stages STG(1) to STG(n) of the shift register may include each of first scan signal generators SC1(1) to SC1(n), second scan signal generators SC2_O(1) to SC2_O(n), SC2_E(1) to SC2_E(n), third scan signal generators SC3(1) to SC3(n), fourth scan signal generators SC4(1) to SC4(n), and emission control signal generators EM(1) to EM(n).

The first scan signal generators SC1(1) to SC1(n) output first scan signals SC1(1) to SC1(n) through first gate lines SCL1 of the display panel 100. The second scan signal generators SC2_O(1) to SC2_O(n) and SC2_E(1) to SC2_E(n) output second scan signals SC2(1) to SC2(n) through second gate lines SCL2 of the display panel 100. The third scan signal generators SC3(1) to SC3(n) output third scan signals SC3(1) to SC3(n) through third gate lines SCL3 of the display panel 100. The fourth scan signal generators SC4(1) to SC4(n) output fourth scan signals SC4(1) to SC4(n) through fourth gate lines SCL4 of the display panel 100. The emission control signal generators EM(1) to EM(n) output emission control signals EM(1) to EM(n) through emission control lines EML of the display panel 100.

Specifically, odd-numbered second scan signal generators SC2_O(1) to SC2_O(n) output second scan signals SC2(1) to SC2(n) to odd-numbered pixel rows. Further, even-numbered second scan signal generators SC2_E(1) to SC2_E(n) output second scan signals SC2(1) to SC2(n) to even-numbered pixel rows. The same second scan signals SC2(1) to SC2(n) may be applied to an odd-numbered pixel row and an even-numbered pixel row which are adjacent to each other.

The first scan signals SC1(1) to SC1(n) may be used as signals to drive an A-th transistor (for example, a compensation transistor) included in the pixel circuit. The second scan signals SC2(1) to SC2(n) may be used as signals to drive a B-th transistor (for example, a data supply transistor) included in the pixel circuit. The third scan signals SC3(1) to SC3(n) may be used as signals to drive a C-th transistor (for example, a bias transistor) included in the pixel circuit. The fourth scan signals SC4(1) to SC4(n) may be used as signals to drive a D-th transistor (for example, an initialization transistor) included in the pixel circuit. The emission control signals EM(1) to EM(n) may be used as signals to drive an E-th transistor (for example, an emission control transistor) included in the pixel circuit. For example, when the emission control transistors of pixels are controlled using emission control signals EM(1) to EM(n), an emission time of the light emitting diode is variable.

Referring to FIG. 3, a bias voltage bus line VobsL, a first initialization voltage bus line VarL, and a second initialization voltage bus line ViniL may be disposed between the gate driver 300 and the active area AA.

The bias voltage bus line VobsL, the first initialization voltage bus line VarL, and the second initialization voltage bus line ViniL may supply a bias voltage Vobs, a first initialization voltage Var, and a second initialization voltage Vini from the power supply unit 500 to the pixel circuit.

In the drawing, it is illustrated that the bias voltage bus line VobsL, the first initialization voltage bus line VarL, and the second initialization voltage bus line ViniL are disposed at only one side of a left side or a right side of the active area AA, but the present disclosure is not limited thereto, and may be disposed at both sides. Further, even though the bias voltage bus line VobsL, the first initialization voltage bus line VarL, and the second initialization voltage bus line ViniL are disposed at one side, a left position or a right position is not limited.

Referring to FIG. 3, in the active area AA, one or more optical areas OA1 and OA2 may be disposed.

One or more optical areas OA1 and OA2 may be disposed so as to overlap one or more optical electronic devices, such as an image capturing device such as a camera (image sensor) and a detection sensor such as a proximity sensor and an illuminance sensor.

In one or more optical areas OA1 and OA2, a light transmission structure is formed to have a predetermined level or higher of transmittance for an operation of an optical electronic device. In other words, the number of pixels P per unit area in one or more optical areas OA1 and OA2 may be smaller than the number of pixels P per unit area in the active area AA, than in a normal area excluding the optical areas OA1 and OA2. That is, the resolution of one or more optical areas OA1 and OA2 may be lower than a resolution of a normal area in the active area AA.

A light transmission structure in one or more optical areas OA1 and OA2 may be configured by patterning the cathode electrode in a part in which the pixel P is not disposed. At this time, the cathode electrode to be patterned may be removed using laser, or the cathode electrode is selectively formed to be patterned using a material such as a cathode deposition stop layer.

Further, in one or more optical areas OA1 and OA2, the light transmission structure may be configured by separately forming the light emitting diode OLED and the pixel circuit in the pixel P. In other words, the light emitting diode OLED of the pixel P is located on the optical areas OA1 and OA2 and the plurality of transistors TFT which configures the pixel circuit is disposed in the vicinity of the optical areas OA1 and OA2. Therefore, the light emitting diode OLED and the pixel circuit may be electrically connected by means of a transparent metal layer.

Figure 4:
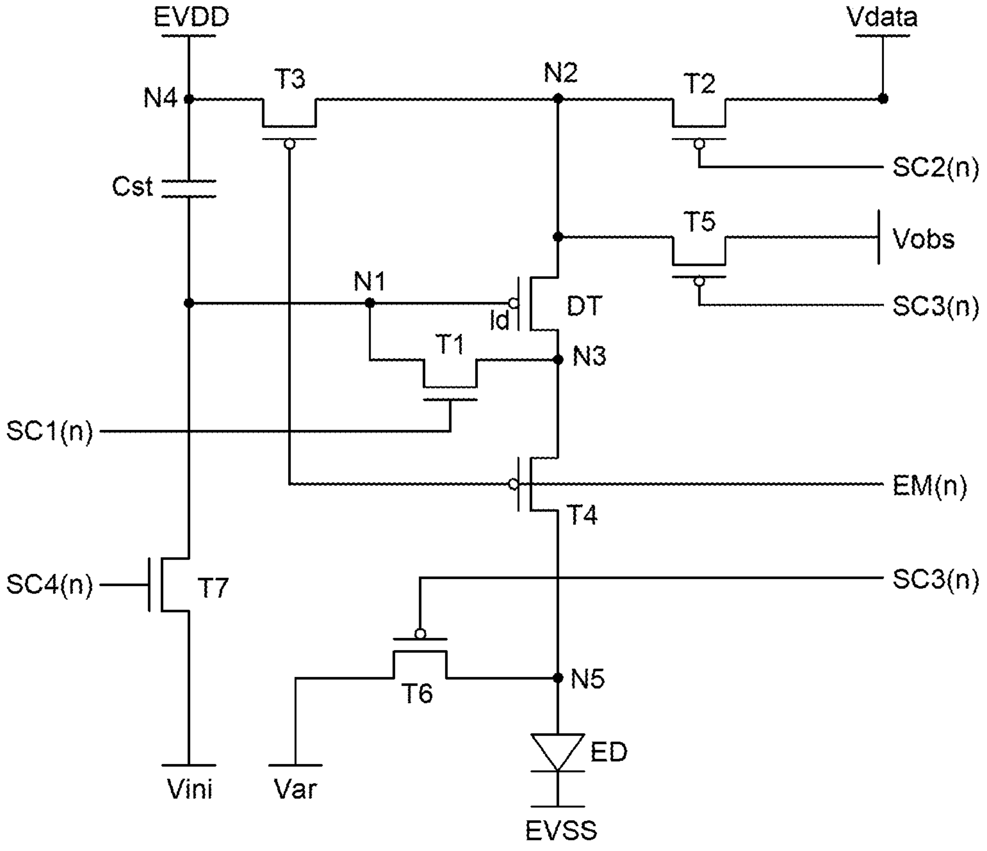
FIG. 4 is a view for illustrating a pixel circuit in a display device according to an example embodiment of the present disclosure.

FIG. 4 is a view for illustrating a pixel circuit in a display device according to an example embodiment of the present disclosure.

FIG. 4 exemplarily illustrates the pixel circuit for description and it is not specifically limited as long as the structure can control the emission of the light emitting diode ED by applying an EM signal EM(n). For example, the pixel circuit may include an additional scan signal, a switching thin film transistor connected thereto, and a switching thin film transistor to which an additional initialization voltage is applied. Further, a connection relationship of a switching element or a connection location of a capacitor may be disposed in various manners. Hereinafter, for the convenience of description, a display device with a pixel circuit structure of FIG. 4 will be described.

Referring to FIG. 4, each of the plurality of pixels P may include a pixel circuit having a driving transistor DT and a light emitting diode ED connected to the pixel circuit.

The pixel circuit controls the driving current which flows in the light emitting diode ED to drive the light emitting diode ED. The pixel circuit may include the driving transistor DT, first to seventh transistors T1 to T7, and the storage capacitor Cst. Each of the transistors DT, T1 to T7 may include a first electrode, a second electrode, and a gate electrode. One of the first electrode and the second electrode may be a source electrode and the other one of the first electrode and the second electrode may be a drain electrode.

Each of the transistors DT, T1 to T7 may be a P-type thin film transistor or an N-type thin film transistor. In the example embodiment of FIG. 4, the first transistor T1 and the seventh transistor T7 are N-type thin film transistors and the remaining transistors DT, T2 to T6 are P-type thin film transistors. However, it is not limited thereto and depending on the example embodiment, all or some of the transistors DT, T1 to T7 may be P-type thin film transistors or N-type thin film transistors. Further, the N-type thin film transistor may be an oxide thin film transistor and the P-type thin film transistor may be a polycrystalline silicon thin film transistor.

Hereinafter, it is exemplified that the first transistor T1 and the seventh transistor T7 are N-type thin film transistors and the remaining transistors DT, T2 to T6 are P-type thin film transistors. Accordingly, a high voltage is applied to the first transistor T1 and the seventh transistor T7 to be turned on and a low voltage is applied to the remaining transistors DT, T2 to T6 to be turned on.

According to the example embodiment, the first transistor T1 which configures the pixel circuit may serve as a compensation transistor, the second transistor T2 may serve as a data supply transistor, the third and fourth transistors T3 and T4 may serve as emission control transistors, and the fifth transistor T5 may serve as a bias transistor. Further, the sixth and seventh transistors T6 and T7 may serve as initialization transistors.

The light emitting diode ED may include an anode electrode and a cathode electrode. The anode electrode of the light emitting diode ED may be connected to a fifth node N5 and the cathode may be connected to a low potential driving voltage EVSS.

The driving transistor DT may include a first electrode connected to a second node N2, a second electrode connected to a third node N3, and a gate electrode connected to a first node N1. The driving transistor DT may provide a driving current Id to the light emitting diode ED based on a voltage of the first node N1 (or a data voltage stored in the storage capacitor Cst to be described below).

The first transistor T1 may include a first electrode connected to the first node N1, a second electrode connected to the third node N3, and a gate electrode which receives a first scan signal SC1(n). The first transistor T1 is turned on in response to the first scan signal SC1(n) and is diode-connected between the first node N1 and the third node N3 to sample a threshold voltage Vth of the driving transistor DT. Such a first transistor T1 may be a compensation transistor.

The storage capacitor Cst may be connected or formed between the first node N1 and a fourth node N4. The storage capacitor Cst may store or maintain the supplied high potential driving voltage EVDD.

The second transistor T2 may include a first electrode which is connected to a data line DL (or receives a data voltage Vdata), a second electrode connected to the second node N2, and a gate electrode which receives a second scan signal SC2(n). The second transistor T2 is turned on in response to a second scan signal SC2(n) and may transmit the data voltage Vdata to the second node N2. Such a second transistor T2 may be a data supply transistor.

The third transistor T3 and the fourth transistor T4 (or first and second emission control transistors) are connected between the high potential driving voltage EVDD and the light emitting diodes EL and may form a current movement path through which the driving current Id generated by the driving transistor DT moves.

The third transistor T3 may include a first electrode which is connected to the fourth node N4 to receive a high potential driving voltage EVDD, a second electrode connected to the second node N2, and a gate electrode which receives an emission control signal EM(n).

The fourth transistor T4 may include a first electrode connected to the third node N3, a second electrode connected to the fifth node N5 (or the anode electrode of the light emitting diode ED), and a gate electrode which receives the emission control signal EM(n).

The third and fourth transistors T3 and T4 are turned on in response to the emission control signal EM(n) and in this case, the driving current Id is supplied to the light emitting diode ED and the light emitting diode ED may emit light with a luminance corresponding to the driving current Id.

The fifth transistor T5 may include a first electrode which receives a bias voltage Vobs, a second electrode connected to the second node N2, and a gate electrode which receives a third scan signal SC3(n). Such a fifth transistor T5 may be a bias transistor.

The sixth transistor T6 may include a first electrode which receives a first initialization voltage Var, a second electrode connected to the fifth node N5, and a gate electrode which receives the third scan signal SC3(n).

The sixth transistor T6 is turned on in response to the third scan signal SC3(n), before the light emitting diode ED emits light (or after the light emitting diode ED emits light) and may initialize the anode electrode (or the pixel electrode) of the light emitting diode ED using the first initialization voltage Var. The light emitting diode ED may have a parasitic capacitor formed between the anode electrode and the cathode electrode. The parasitic capacitor is charged while the light emitting diode ED emits light so that the anode electrode of the light emitting diode ED may have a specific voltage. Accordingly, the first initialization voltage Var is applied to the anode electrode of the light emitting diode ED through the sixth transistor T6 to initialize a quantity of charges accumulated in the light emitting diode ED.

In the present disclosure, the gate electrodes of the fifth and sixth transistors T5 and T6 are configured to commonly receive the third scan signal SC3(n). However, the present disclosure is not essentially limited thereto and the gate electrodes of the fifth and sixth transistors T5 and T6 may be configured to receive separate scan signals to be independently controlled.

The seventh transistor T7 may include a first electrode which receives a second initialization voltage Vini, a second electrode connected to the first node N1, and a gate electrode which receives a fourth scan signal SC4(n).

The seventh transistor T7 is turned on in response to the fourth scan signal SC4(n) and may initialize the gate electrode of the driving transistor DT using the second initialization voltage Vini. In the gate electrode of the driving transistor DT, unnecessary charges may remain due to the high potential driving voltage EVDD stored in the storage capacitor Cst. Accordingly, the second initialization voltage Vini is applied to the gate electrode of the driving transistor DT through the seventh transistor T7 to initialize the remaining quantity of charges.

Figure 5A:
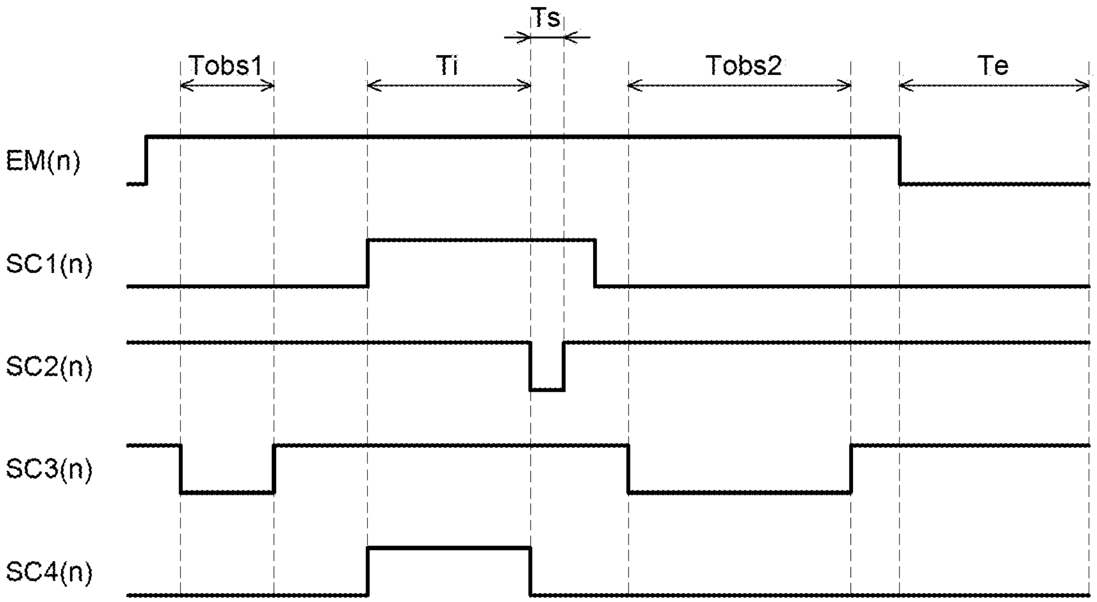
FIGS. 5A and 5B are views for explaining an operation of a scan signal and an emission control signal in a refresh period and a hold period in a pixel circuit illustrated in FIG. 4.
Figure 5B:
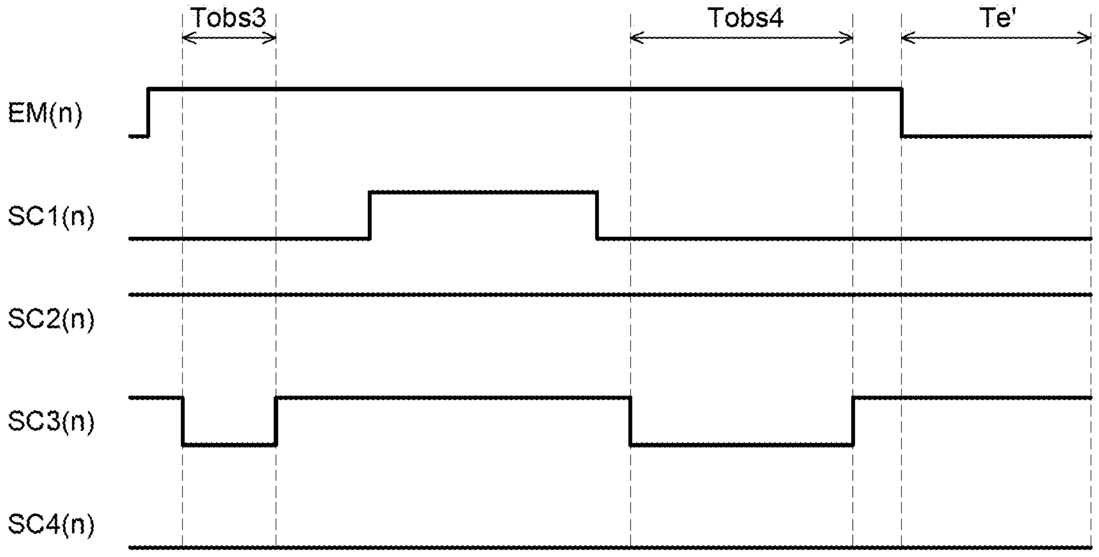

FIGS. 5A and 5B are views for explaining an operation of a scan signal and an emission control signal in a refresh period and a hold period in a pixel circuit illustrated in FIG. 4.

A display device according to the example embodiment of the present disclosure may operate as a variable refresh rate (VRR) mode display device. In the VRR mode, the pixel is driven at a constant frequency and at the time when a high speed driving is necessary, a refresh rate at which the data voltage Vdata is updated is increased to operate the pixel or at a time when the power consumption needs to be lowered or low-speed driving is necessary, the refresh rate is lowered to operate the pixel.

Each of the plurality of pixels P may be driven by a combination of a refresh frame and a hold frame in one second. In the present disclosure, one set is defined that a combination of a refresh period in which the data voltage Vdata is updated and a hold period in which the data voltage Vdata is not updated is repeated for one second. One set period is a cycle in which a combination of the refresh period and the hold period is repeated.

When the refresh rate is driven at 120 Hz, it may be driven only with the refresh period. That is, the refresh period may be driven 120 times in one second. One refresh period is 1/120=8.33 ms and one set period is also 8.33 ms.

When the refresh rate is driven at 60 Hz, the refresh period and the hold period may be alternately driven. That is, the refresh period and the hold period may be alternately driven 60 times each in one second. One refresh period and one hold period are each 0.5/60=8.33 ms and one set period is 16.66 ms.

When the refresh rate is driven at 1 Hz, one frame may be driven with one refresh period and 119 hold periods after the one refresh period. Further, when the refresh rate is driven at 1 Hz, one frame may be driven with a plurality of refresh periods and a plurality of hold periods. At this time, one refresh period and one hold period are each 1/120=8.33 ms and one set period is 1 s.

In the refresh period, a new data voltage Vdata is charged to apply a new data voltage Vdata to the driving transistor DT and in the hold period, a data voltage Vdata of a previous frame is held to be used as it is. In the meantime, in the hold period, a process of applying the new data voltage Vdata to the driving transistor DT is omitted so that the hold period is also referred to as a skip period.

Each of the plurality of pixels P may initialize a voltage which is charged in the pixel circuit or remains during the refresh period. Specifically, each of the plurality of pixels P may remove the influence of the data voltage Vdata and the high potential driving voltage EVDD stored in the previous frame in the refresh period. Accordingly, each of the plurality of pixels P may display an image corresponding to a new data voltage Vdata in the hold period.

Each of the plurality of pixels P may supply a driving current corresponding to the data voltage Vdata to the light emitting diode ED to display images and may maintain a turned-on state of the light emitting diode ED, during the hold period.

First, the driving of the pixel circuit and the light emitting diode in the refresh period of FIG. 5A will be described. The refresh period may operate including at least one bias section Tobs1 and Tobs2, an initialization section Ti, a sampling section Ts, and an emission section Te, but this is just an example embodiment and is not necessarily bound to this order.

Referring to FIG. 5A, the pixel circuit may operate including at least one bias section Tobs1 and Tobs2 during the refresh period.

At least one bias section Tobs1 and Tobs2 is a section in which an on-bias stress operation OBS to apply a bias voltage Vobs is performed, the emission control signal EM(n) is a high voltage, and the third and fourth transistors T3 and T4 operate to be off. The first scan signal SC1(n) and the fourth scan signal SC4(n) are low voltages and the first transistor T1 and the seventh transistor T7 operate to be off. The second scan signal SC2 is a high voltage and the second transistor T2 operates to be off.

The third scan signal SC3(n) is input as a low voltage and the fifth and sixth transistors T5 and T6 are turned on. As the fifth transistor T5 is turned on, the bias voltage Vobs is applied to the first electrode of the driving transistor DT connected to the second node N2.

Here, the bias voltage Vobs is applied to the third node N3 which is a drain electrode of the driving transistor DT so that a charging time or charging delay of the voltage of the fifth node N5 which is the anode electrode of the light emitting diode ED in the emission period may be reduced. The driving transistor DT maintains a stronger saturation state.

For example, the higher the bias voltage Vobs, the higher the voltage of the third node N3 which is the drain electrode of the driving transistor DT and the lower the gate-source voltage or the drain-source voltage of the driving transistor DT. Accordingly, the bias voltage Vobs is desirably higher than the data voltage Vdata.

At this time, the magnitude of the drain-source current Id which passes through the driving transistor DT may be reduced and in a positive bias stress situation, the stress of the driving transistor DT is reduced to solve the charging delay of the voltage of the third node N3. In other words, before sampling a threshold voltage Vth of the driving transistor DT, the on-bias stress operation OBS is performed to relieve the hysteresis of the driving transistor DT.

Accordingly, in at least one bias section Tobs1 and Tobs2, the on-bias stress operation OBS may be defined as an operation of directly applying an appropriate bias voltage to the driving transistor DT during non-emission periods.

Further, in at least one bias section Tobs1 and Tobs2, the sixth transistor T6 is turned on so that the anode electrode (or the pixel electrode) of the light emitting diode ED connected to the fifth node N5 is initialized with the first initialization voltage Var.

However, the gate electrodes of the fifth and sixth transistors T5 and T6 may be configured to receive separate scan signals to be independently controlled. That is, it is not required to necessarily simultaneously apply the bias voltage to the first electrode of the driving transistor DT and the anode electrode of the light emitting diode ED in the bias section.

Referring to FIG. 5A, the pixel circuit may operate including the initialization section Ti during the refresh period. The initialization section Ti is a section in which the voltage of the gate electrode of the driving transistor DT is initialized.

The first scan signal SC1(n) to the fourth scan signal SC4(n) and the emission control signal EM(n) are high voltages and the first transistor T1 and the seventh transistor T7 operate to be turned on. The second to sixth transistors T2, T3, T4, T5, and T6 operate to be turned off. As the first and seventh transistors T1 and T7 are turned on, the gate electrode of the driving transistor DT and the second electrode connected to the first node N1 are initialized with the second initialization voltage Vini.

Referring to FIG. 5A, the pixel circuit may operate including the sampling section Ts during the refresh period. The sampling section is a section in which the threshold voltage Vth of the driving transistor DT is sampled.

The first scan signal SC1(n), the third scan signal SC3(n), and the emission control signal EM(n) are high voltages and the second scan signal SC2(n) and the fourth scan signal SC4(n) are low voltages. Accordingly, the third to seventh transistors T3, T4, T5, T6, and T7 operate to be turned off, the first transistor T1 maintains an on-state, and the second transistor T2 operates to be turned on. That is, the second transistor T2 is turned on to apply the data voltage Vdata to the driving transistor DT and the first transistor T1 is diode-connected between the first node N1 and the third node N3 to sample the threshold voltage Vth of the driving transistor DT.

Referring to FIG. 5A, the pixel circuit may operate including an emission section Te during the refresh period. The emission section Te is a section in which the sampled threshold voltage Vth is cancelled and the driving current corresponding to the sampled data voltage allows the light emitting diode ED to emit light.

The emission control signal EM(n) is a low voltage and the third and fourth transistors T3 and T4 operate to be turned on.

As the third transistor T3 is turned on, the high potential driving voltage EVDD connected to the fourth node N4 is applied to the first electrode of the driving transistor DT connected to the second node N2 through the third transistor T3. The driving current Id which is supplied from the driving transistor DT to the light emitting diode ED via the fourth transistor T4 becomes independent of the value of the threshold voltage Vth of the driving transistor DT so that the threshold voltage Vth of the driving transistor DT is compensated for operation.

Next, the driving of the pixel circuit and the light emitting diode during the hold period will be described with reference to FIG. 5B.

The hold period may include at least one bias section Tobs3 and Tobs4 and the emission section Te'. The same operation of the pixel circuit as the operation of the refresh period will not be described.

As described above, in the refresh period, a new data voltage Vdata is charged to apply a new data voltage Vdata to the gate electrode of the driving transistor DT, but in the hold period, the data voltage Vdata of the refresh period is held to be used as it is. Accordingly, the hold period does not require the initialization section Ti and the sampling section Ts, unlike the refresh period.

In the operation of the hold period, even a single on-bias stress operation OBS may be sufficient. However, in the example embodiment, for the convenience of the driving circuit, the third scan signal SC3(n) of the hold period is driven as the same as the third scan signal SC3(n) of the refresh period so that the on-bias stress operation OBS may operate twice as in the refresh period.

The difference between the driving signal in the refresh period which has been described with reference to FIG. 5A and the driving signal of the hold period in FIG. 5B is the second and fourth scan signals SC2(n) and SC4(n). In the hold period, the initialization section Ti and the sampling section Ts are not necessary so that unlike the refresh period, the second scan signal SC2(n) is always a high voltage and the fourth scan signal SC4(n) is always a low voltage. That is, the second and seventh transistors T2 and T7 are always turned off.

Figure 6:
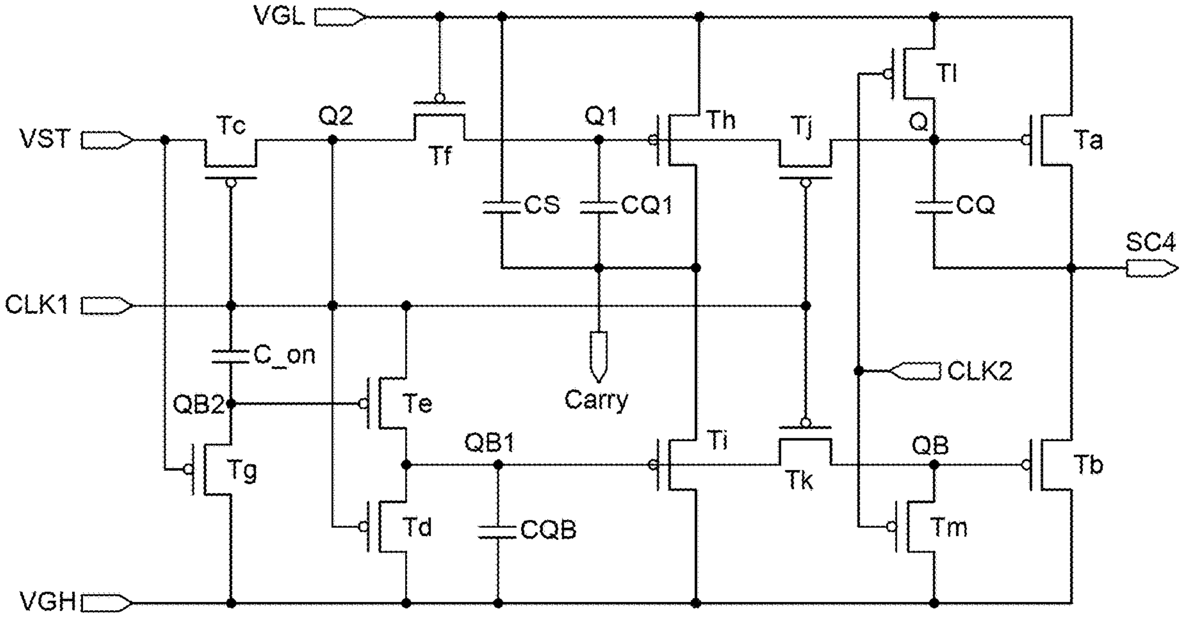
FIG. 6 is a circuit diagram of a stage of a gate driver of a display device according to an example embodiment of the present disclosure.

FIG. 6 is a circuit diagram of a stage of a gate driver of a display device according to an example embodiment of the present disclosure.

For example, in FIG. 6, a circuit of a fourth scan driver 324 included in each of the plurality of stages of a gate driver is illustrated. A circuit configuration of another emission control signal driver 310 and scan drivers 321, 322, and 323 included in each of the plurality of stages may be the same as the fourth scan driver 324. However, it is not limited thereto and circuits of another emission control signal driver 310 and the scan drivers 321, 322, and 323 may be modified in various forms.

For example, a first scan driver 321 and a fourth scan driver 324 which generate a scan signal for controlling an oxide thin film transistor including an oxide semiconductor material may have the same structure. Further, a second scan driver 322 and a third scan driver 323 which generate a scan signal for controlling a thin film transistor including a polycrystalline semiconductor material and an emission control signal driver 310 which generates an emission control signal may be designed to have different circuit structures.

Each of the plurality of fourth scan drivers 324 of the gate driver of the display device according to an example embodiment of the present disclosure includes first to thirteenth transistors Ta to Tm and first to fifth capacitors CQ, CQB, C_on, CQ1, and CS.

In a first transistor Ta, a first electrode is connected to a gate low voltage (VGL) supply line, a gate electrode is connected to a Q node Q, and a second electrode is connected to an output terminal. Therefore, the first transistor Ta is turned on/off according to a voltage of the Q node Q to output a gate low voltage VGL to a fourth scan signal SC4 which is an output.

In a second transistor Tb, a first electrode is connected to a gate high voltage (VGH) supply line, a gate electrode is connected to a QB node QB, and a second electrode is connected to an output terminal. The second transistor Tb is turned on/off according to a voltage of the QB node QB to output a gate high voltage VGH to the fourth scan signal SC4 which is an output.

In a third transistor Tc, a first electrode is connected to a start signal (VST) input terminal or an output terminal of a fourth scan signal SC4 in a previous stage, a gate electrode is connected to a first clock signal (CLK1) supply line, and a second electrode is connected to a Q2 node Q2. Therefore, the third transistor Tc is turned on/off according to the first clock signal CLK1 to apply a start signal VST or a fourth scan signal SC4 in a previous stage to the Q2 node Q2.

In a fourth transistor Td, a first electrode is connected to a gate high voltage (VGH) supply line, a gate electrode is connected to a Q2 node Q2, and a second electrode is connected to a QB1 node QB1. Therefore, the fourth transistor Td is turned on/off according to a voltage of the Q2 node Q2 to supply a gate high voltage VGH to the QB1 node QB1.

In a fifth transistor Te, a first electrode is connected to a first clock signal (CLK1) supply line, a gate electrode is connected to a QB2 node QB2, and a second electrode is connected to the QB1 node QB1. Therefore, the fifth transistor Te is turned on/off according to a voltage of the QB2 node QB2 to supply a first clock signal CLK1 to the QB1 node QB1.

In a sixth transistor Tf, a first electrode is connected to the Q2 node Q2, a gate electrode is connected to the gate low voltage (VGL) supply line, and a second electrode is connected to the Q1 node Q1. Therefore, the sixth transistor Tf is turned on/off according to the gate low voltage VGL to connect the Q2 node Q2 and the Q1 node Q1.

In a seventh transistor Tg, a first electrode is connected to a gate high voltage (VGH) supply line, a gate electrode is connected to a start signal (VST) input terminal or an output terminal of a fourth scan signal SC4 in a previous stage, and a second electrode is connected to the QB2 node QB2. Therefore, the seventh transistor Tg is turned on/off according to the start signal VST or the fourth scan signal in a previous stage to supply the gate high voltage VGH to the QB2 node QB2.

In an eighth transistor Th, a first electrode is connected to the gate low voltage (VGL) supply line, a gate electrode is connected to the Q1 node Q1, and a second electrode is connected to a carry signal (Carry) output terminal. Therefore, the eighth transistor Th is turned on/off according to a voltage of the Q1 node Q1 to output a gate low voltage VGL as the carry signal Carry.

In a ninth transistor Ti, a first electrode is connected to a gate high voltage (VGH) supply line, a gate electrode is connected to a QB1 node QB1, and a second electrode is connected to the carry signal (Carry) output terminal. The ninth transistor Ti is turned on/off according to a voltage of the QB1 node QB1 to output a gate high voltage VGH as a carry signal Carry.

In a tenth transistor Tj, a first electrode is connected to the Q1 node Q1, a gate electrode is connected to the first clock signal (CLK1) supply line, and a second electrode is connected to the Q node Q. Therefore, the tenth transistor Tj is turned on/off according to the first clock signal CLK1 to connect the Q1 node Q1 and the Q node Q.

In an eleventh transistor Tk, a first electrode is connected to the QB1 node QB1, a gate electrode is connected to the first clock signal (CLK1) supply line, and a second electrode is connected to the QB node QB. Therefore, the eleventh transistor Tk is turned on/off according to the first clock signal CLK1 to connect the QB1 node QB1 and the QB node QB.

In a twelfth transistor T1, a first electrode is connected to the gate low voltage (VGL) supply line, a gate electrode is connected to a second clock signal (CLK2) supply line, and a second electrode is connected to the Q node Q. Therefore, the twelfth transistor T1 is turned on/off according to the second clock signal CLK2 to supply the gate low voltage VGL to the Q node Q.

In a thirteenth transistor Tm, a first electrode is connected to the gate high voltage (VGH) supply line, a gate electrode is connected to the second clock signal (CLK2) supply line, and a second electrode is connected to the QB node QB. Therefore, the thirteenth transistor Tm is turned on/off according to the second clock signal CLK2 to supply the gate high voltage VGH to the QB node QB.

A first capacitor CQ is connected between the gate electrode and the second electrode of the first transistor Ta to bootstrap the Q node Q.

A second capacitor CQB is connected between the gate high voltage (VGH) supply line and the QB1 node QB1 to maintain a voltage of the QB1 node QB1 even though a toggle period of the clock signals CLK1 and CLK2 is increased.

A third capacitor C_on is connected between the first clock signal supply line and the QB2 node QB2 to generate a kick-back phenomenon by the first clock signal CLK1 to turn on the fifth transistor Te.

A fourth capacitor CQ1 is connected between the gate electrode and the second electrode of the eighth transistor Th to bootstrap the Q1 node Q1.

A fifth capacitor CS is connected between the gate low voltage (VGL) supply line and the carry signal (Carry) output terminal to stabilize the carry signal Carry.

The first and second capacitors CQ and CQB may be designed to have a larger capacity than that of the third to fifth capacitors C_on, CQ1, and CS. Further, the first and second capacitors CQ and CQB may be designed to have a larger area than that of the third to fifth capacitors C_on, CQ1, and CS.

Each of the above-described first to fifth capacitors CQ, CQB, C_on, CQ1, and CS may be designed to have a capacitance of 50 pF or higher, but is not limited thereto and each of capacitances of the first to fifth capacitors CQ, CQB, C_on, CQ1, and CS may vary depending on the design.

In the meantime, the first transistor Ta, the second transistor Tb, and the first capacitor CQ which are connected to the output terminal of each of the plurality of fourth scan drivers 324 are directly associated with the output of the fourth scan signal SC4. Therefore, the first transistor Ta, the second transistor Tb, and the first capacitor CQ may be defined as scan signal output units.

The eighth transistor Th, the ninth transistor Ti, the second capacitor CQB, the fourth capacitor CQ1, and the fifth capacitor CS which are connected to the carry signal output terminal of each of the plurality of fourth scan drivers 324 are directly associated with the output of the carry signal Carry. Therefore, the eighth transistor Th, the ninth transistor Ti, the second capacitor CQB, the fourth capacitor CQ1, and the fifth capacitor CS may be defined as carry signal output units.

Further, the third to seventh transistors Tc to Tg, the tenth to thirteenth transistors Tj to Tm, and the third capacitor C_on are components related to the control of the Q node, the Q1 node, the Q2 node, the QB node, the QB1 node, and the QB2 node to be defined as node controllers.

Specifically, the third transistor Tc, the seventh transistor Tg, and the third capacitor C_on which control the Q2 node and the QB2 node may be defined as first node controllers. The fourth transistor Td, the fifth transistor Te, the sixth transistor Tf, and the second capacitor CQB which control the Q1 node and the QB1 node may be defined as second node controllers. The tenth transistor Tj, the eleventh transistor Tk, the twelfth transistor T1, and the thirteenth transistor Tm which control the Q node and the QB node may be defined as third node controllers.

An operation of each of the plurality of fourth scan drivers 324 which is configured as described above will be described with reference to FIGS. 7 to 8E as follows.

Figure 7:
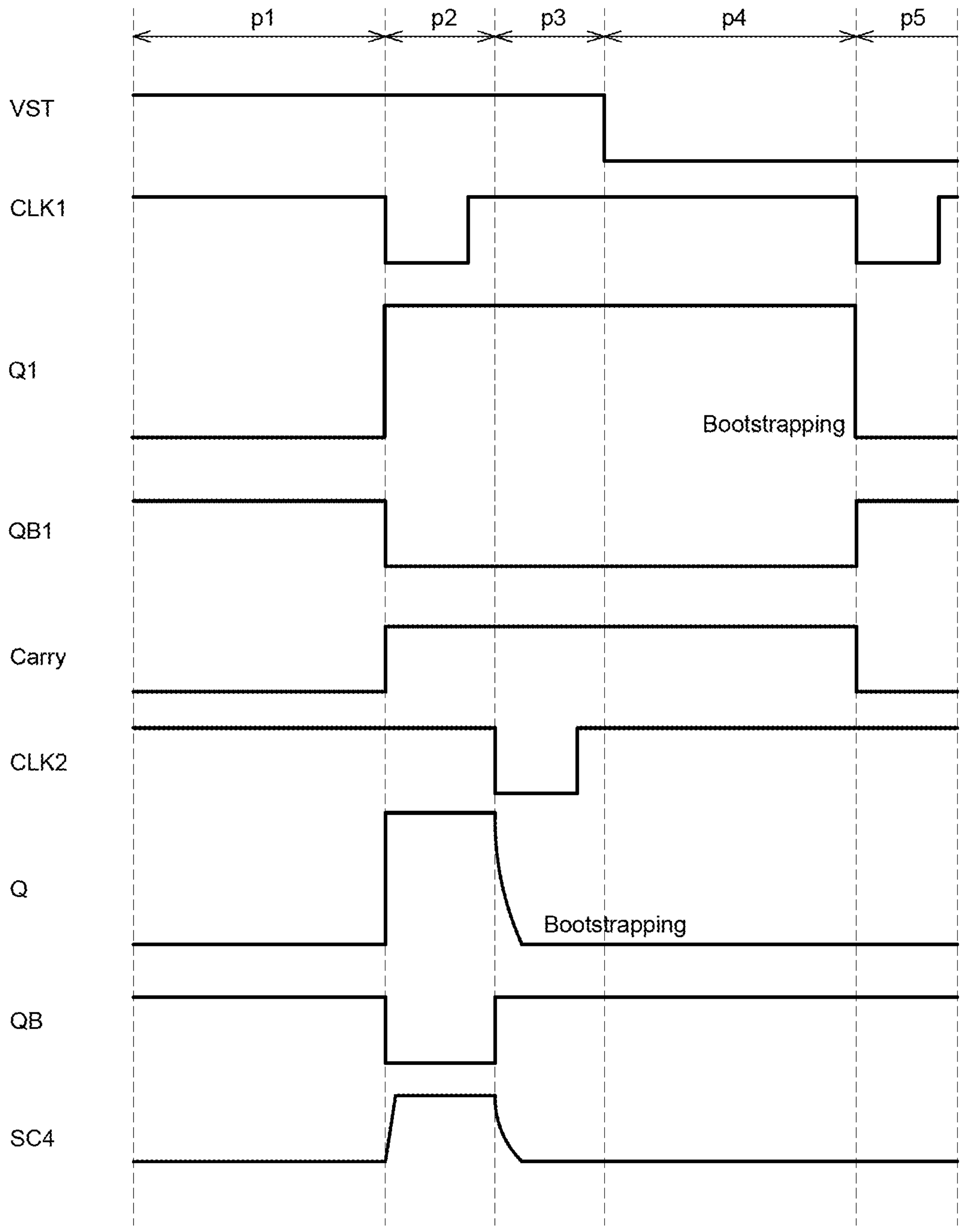
FIG. 7 is a waveform illustrating signals which are input and output to and from a plurality of stages of a gate driver of a display device according to an example embodiment of the present disclosure.

FIG. 7 is a waveform illustrating signals which are input and output to and from a plurality of stages of a gate driver of a display device according to an example embodiment of the present disclosure.

Figure 8A:
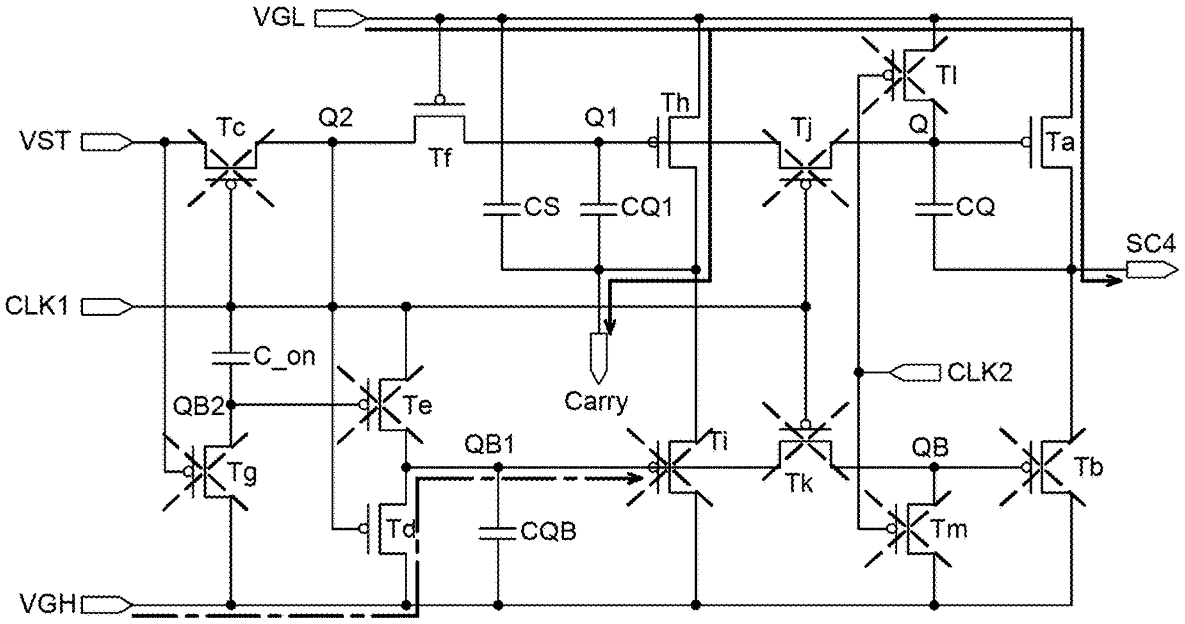
FIG. 8A is a circuit diagram for explaining an operation of a plurality of stages of a gate driver of a display device according to an example embodiment of the present disclosure, in a first period.

FIG. 8A is a circuit diagram for explaining an operation of a plurality of stages of a gate driver of a display device according to an example embodiment of the present disclosure, in a first period.

Figure 8B:
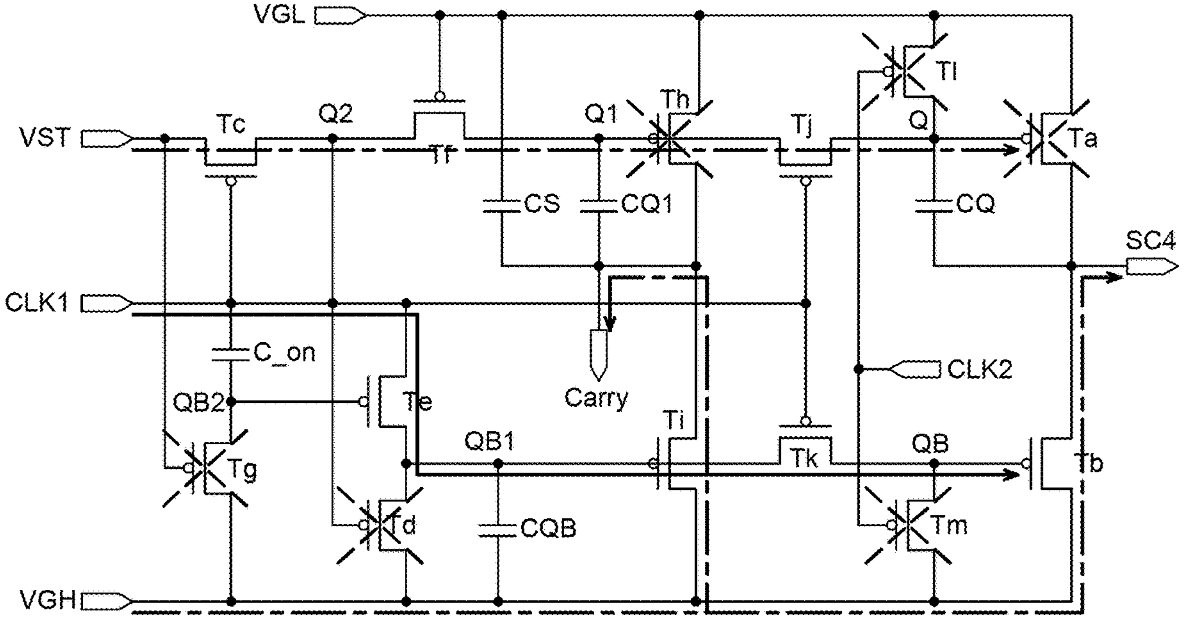
FIG. 8B is a circuit diagram for explaining an operation of a plurality of stages of a gate driver of a display device according to an example embodiment of the present disclosure, in a second period.

FIG. 8B is a circuit diagram for explaining an operation of a plurality of stages of a gate driver of a display device according to an example embodiment of the present disclosure, in a second period.

Figure 8C:
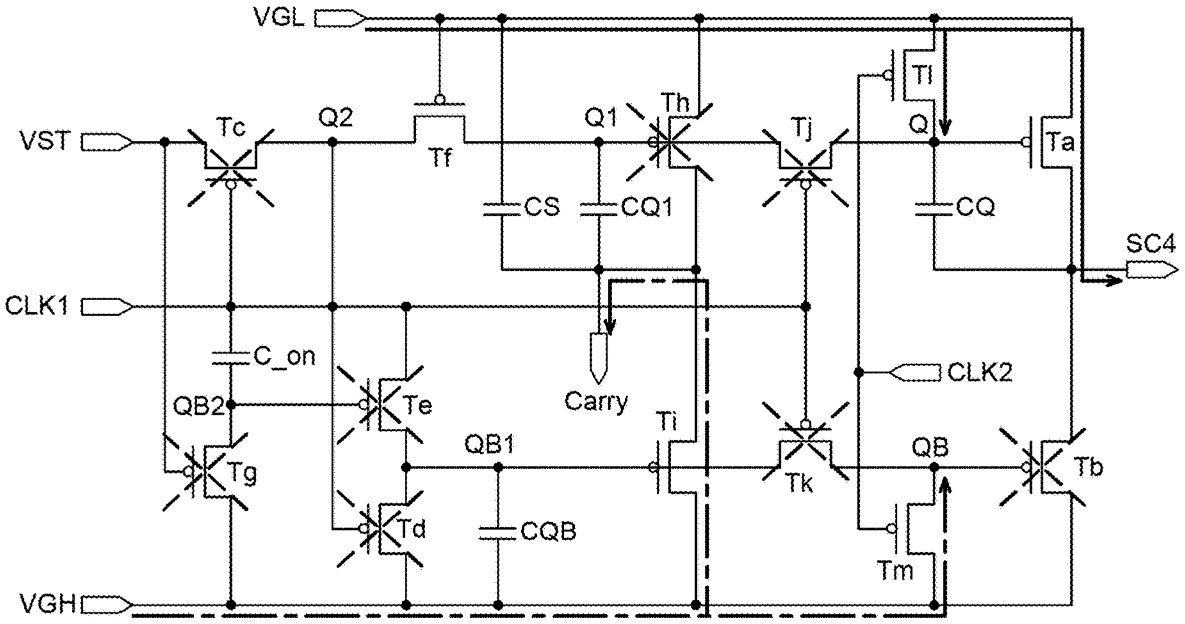
FIG. 8C is a circuit diagram for explaining an operation of a plurality of stages of a gate driver of a display device according to an example embodiment of the present disclosure, in a third period.

FIG. 8C is a circuit diagram for explaining an operation of a plurality of stages of a gate driver of a display device according to an example embodiment of the present disclosure, in a third period.

Figure 8D:
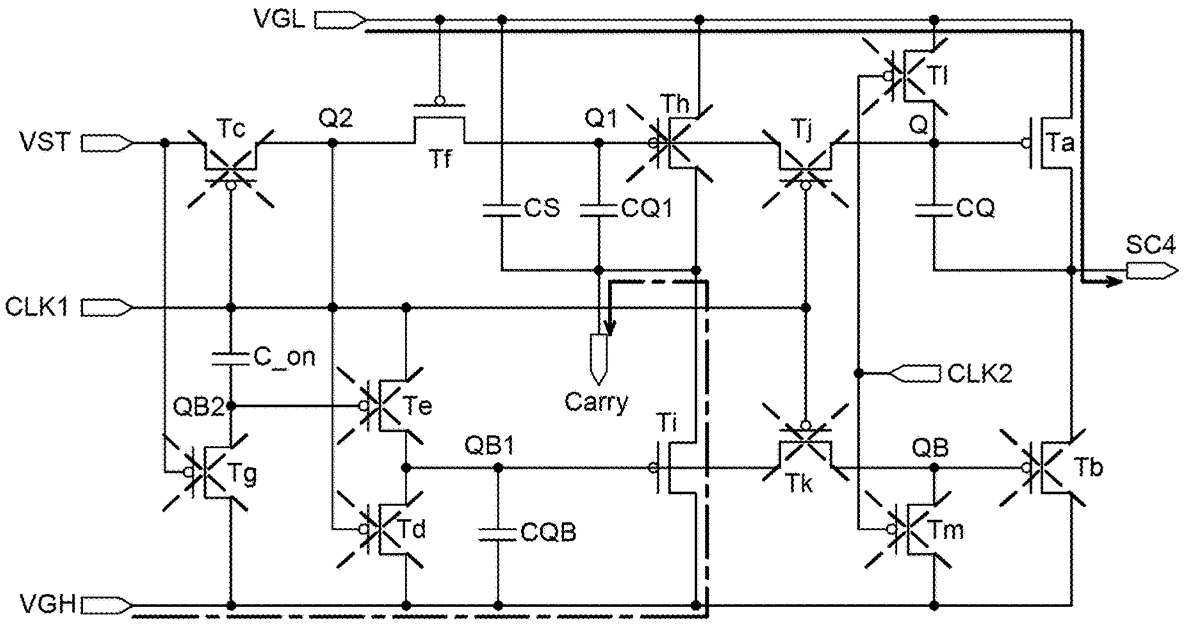
FIG. 8D is a circuit diagram for explaining an operation of a plurality of stages of a gate driver of a display device according to an example embodiment of the present disclosure, in a fourth period.

FIG. 8D is a circuit diagram for explaining an operation of a plurality of stages of a gate driver of a display device according to an example embodiment of the present disclosure, in a fourth period.

Figure 8E:
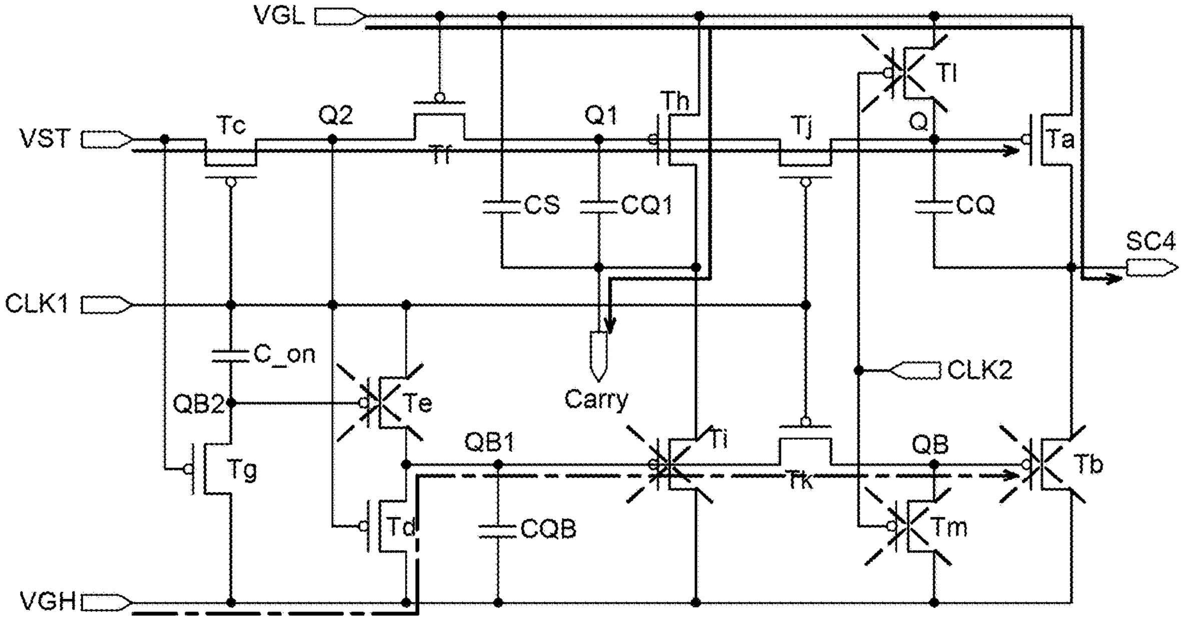
FIG. 8E is a circuit diagram for explaining an operation of a plurality of stages of a gate driver of a display device according to an example embodiment of the present disclosure, in a fifth period.

FIG. 8E is a circuit diagram for explaining an operation of a plurality of stages of a gate driver of a display device according to an example embodiment of the present disclosure, in a fifth period.

As illustrated in FIGS. 7 and 8A, in a first period p1, the start signal VST is input as a high level so that the seventh transistor Tg is turned off and the gate electrode of the fifth transistor Te is floated.

A voltage of the Q2 node Q2 may be initially set to a low level. Accordingly, the fourth transistor Td is turned on to output the gate high voltage VGH to the QB1 node QB1.

Further, a voltage of the Q1 node Q1 may also be initially set to a low level. Accordingly, the eighth transistor Th is turned on to output the gate low voltage VGL as the carry signal Carry.

Further, a voltage of the Q node Q may also be initially set to a low level. Accordingly, the first transistor Ta is turned on to output the gate low voltage VGL as the scan signal.

As illustrated in FIGS. 7 and 8B, in a second period p2 after the first period p1, the first clock signal CLK1 falls down from the high level to the low level so that the third transistor Tc and the tenth transistor Tj are turned on. Therefore, all the Q node Q, the Q1 node Q1, and Q2 node Q2 are charged to a high level which is a level of the start signal VST. Therefore, the first transistor Ta and the eighth transistor Th are turned off.

The QB2 node QB2 is charged to a low level due to the kick-back by the third capacitor C_on so that the fifth transistor Te is turned on. Therefore, the QB1 node QB1 is charged to a low level which is a level of the first clock signal CLK1.

Accordingly, the ninth transistor Ti is turned on to output the gate high voltage VGH as the carry signal Carry.

Further, the first clock signal CLK1 falls down from the high level to the low level so that the eleventh transistor Tk is also turned on to charge the QB node QB with a low level which is a level of the first clock signal CLK1.

As a result, the first transistor Ta is turned off and the second transistor Tb is turned on to output the gate high voltage VGH as the scan signal SC4.

As illustrated in FIGS. 7 and 8C, in a third period p3 after the second period p2, the second clock signal CLK2 falls down from the high level to the low level so that the twelfth transistor T1 and the thirteenth transistor Tm are turned on. Therefore, the Q node Q is charged to the gate low voltage VGL and the QB node QB is charged to the gate high voltage VGH. Therefore, the first transistor Ta is turned on and the second transistor Tb is turned off to output the gate low voltage VGL as the scan signal.

Specifically, in the third period p3, a voltage applied to the gate of the first transistor Ta and a voltage applied to the first electrode (Source) are the same level. That is, a gate-source voltage Vgs of the first transistor Ta is 0 V.

Vgs of the first transistor Ta is 0 V so that the first transistor Ta is turned off and the Q node Q is floated. The floated Q node Q is bootstrapped by the first capacitor CQ to maintain a voltage which is lower than the gate low voltage VGL.

Here, a pulse with of the scan signal SC4 may be determined by a toggling timing of the first clock signal CLK1 and a toggling timing of the second clock signal CLK2.

That is, at the time when the first clock signal CLK1 is toggled from the high level to the low level, the scan signal SC4 is toggled from the low level to the high level and at the time when the second clock signal CLK2 is toggled from the high level to the low level, the scan signal SC4 is toggled from the high level to the low level.

In the third period p3, the first clock signal CLK1 rises from the low level to the high level so that the tenth transistor Tj and the eleventh transistor Tk are turned off and the Q1 node Q1 may be maintained at a high level and the QB1 node QB1 may be maintained at a low level. Accordingly, the ninth transistor Ti is turned on to output the gate high voltage VGH as the carry signal Carry.

As illustrated in FIGS. 7 and 8D, in a fourth period p4 after the third period p3, the second clock signal CLK2 rises from the low level to the high level so that the twelfth transistor Tl and the thirteenth transistor Tm are turned off. Therefore, the Q node Q is floated to be maintained at a voltage which is lower than the gate low voltage VGL and the QB node QB is also floated to be maintained at the gate high voltage VGH. Therefore, the first transistor Ta is turned on and the second transistor Tb is turned off to output the gate low voltage VGL as the scan signal.

In the fourth period p4, the first clock signal CLK1 is maintained at the high level so that the tenth transistor Tj and the eleventh transistor Tk are turned off and the Q1 node Q1 may be maintained at a high level and the QB1 node QB1 may be maintained at a low level. Accordingly, the ninth transistor Ti is turned on to output the gate high voltage VGH as the carry signal Carry.

In the fourth period p4, the start signal VST falls down from the high level to the low level.

As illustrated in FIGS. 7 and 8E, in a fifth period p5 after the fourth period p4, in a state in which the start signal VST is input at the low level, if the first clock signal CLK1 falls to the low level, the third transistor Tc is turned on so that the Q2 node Q2 is charged to the low level. Further, the sixth transistor Tf is turned on so that the Q1 node Q1 is charged to the low level and the tenth transistor Tj is turned on so that the Q node Q is charged to the low level.

Further, the Q2 node Q2 is charged to the low level so that the fourth transistor Td is turned on to charge the QB1 node QB1 to a high level.

Further, the Q1 node is charged to the low level so that the eighth transistor Th is turned on to charge the QB1 node QB1 to a low level. Therefore, the ninth transistor Ti is turned off. Accordingly, the gate low voltage VGL is output as the carry signal Carry.

Specifically, in the fifth period p5, a voltage applied to the gate of the eighth transistor Th and a voltage applied to the first electrode (Source) are the same level. That is, a gate-source voltage Vgs of the eighth transistor Th is 0 V.

Vgs of the eighth transistor Th is 0 V so that the eighth transistor Th is turned off and the Q1 node Q1 is floated. The floated Q1 node Q1 is bootstrapped by the fourth capacitor CQ1 to maintain a voltage which is lower than the gate low voltage VGL.

The clock signal CLK1 falls down to the low level so that the eleventh transistor Tk is turned on to output the gate high voltage VGH to the QB node QB.

Therefore, the first transistor Ta is turned on and the second transistor Tb is turned off to output the gate low voltage VGL as the scan signal.

As described above, the width of the carry signal Carry may be determined by a toggling period of the first clock signal CLK1.

In other words, at the time when the first clock signal CLK1 is toggled from the high level to the low level, the carry signal Carry may be toggled.

As described above, in the display device according to the example embodiment of the present disclosure, a pulse width of the scan signal may be set by controlling a toggling timing of the first clock signal CLK1 and a toggling timing of the second clock signal CLK2. A pulse width of the scan signal may be set to be 1 H (horizontal period) or shorter so that the scan signal can be set in accordance with various driving timings.

Further, the display device according to the example embodiment of the present disclosure does not output the clock signal as a scan signal, but outputs a constant voltage, such as a gate high voltage or a gate low voltage, as a scan signal. Therefore, a stability of scan signal output is improved to improve a driving reliability of the display device.

The display device according to the example embodiment of the present disclosure outputs a high level of gate-on level scan signal to drive a transistor including an n-type oxide semiconductor in a plurality of pixels.

Further, in the example embodiment of the present disclosure, a high level of a gate-on level scan signal may be output without separately including an inverter. That is, in order to output a high level of gate-on level scan signal using the inverter, a separate power line for an operation of the output unit needs to be designed, but according to the example embodiment of the present disclosure, a high level of a gate-on level scan signal may be output without separately including an inverter.

Therefore, according to the example embodiment of the present disclosure, a separate power line for driving an inverter is not necessary so that a bezel area may be reduced and the increase in separate power consumption may be suppressed.

The example embodiments of the present disclosure can also be described as follows:

In order to achieve the objects as described above, according to an aspect of the present disclosure, a gate driver may include: a plurality of stages which is dependently connected to each other, each of the plurality of stages may include: a node controller configured to control voltages of a Q node, a Q1 node, a Q2 node, a QB node, a QB1 node, and a QB2 node based on a first clock signal and a second clock signal; a carry signal output unit configured to output a carry signal to a next stage based on the voltages of the Q1 node and the QB1 node; and a scan signal output unit configured to output a scan signal to a scan line based on the voltages of the Q node and the QB node, and a width of the scan signal may be determined by a toggling timing of the first clock signal and a toggling timing of the second clock signal.

The scan signal output unit may include, a first transistor including a first electrode connected to a gate low voltage supply line, a gate electrode connected to the Q node, and a second electrode connected to a scan signal output terminal; a second transistor including a first electrode connected to a gate high voltage supply line, a gate electrode connected to the QB node, and a second electrode connected to the scan signal output terminal; and a first capacitor connected between the gate electrode and the second electrode of the first transistor.

At a time when the second clock signal is toggled from a high level to a low level, the first capacitor may bootstrap the Q node.

The carry signal output unit may include an eighth transistor including a first electrode connected to a gate low voltage supply line, a gate electrode connected to the Q1 node, and a second electrode connected to a carry signal output terminal; a ninth transistor including a first electrode connected to a gate high voltage supply line, a gate electrode connected to the QB1 node, and a second electrode connected to the carry signal output terminal; a fourth capacitor which is connected between the gate electrode and the second electrode of the eighth transistor; and a fifth capacitor which is connected between the gate low voltage supply line and the carry signal output terminal.

At a time when the first clock signal is toggled from a high level to a low level, the fourth capacitor may bootstrap the Q1 node.

The node controller may include a first node controller configured to control the Q2 node and the QB2 node; a second node controller configured to control the Q1 node and the QB1 node; and a third node controller configured to control the Q node and the QB node.

The first node controller may include, a third transistor including a first electrode connected to a start signal input terminal or a carry signal output terminal of a previous stage, a gate electrode connected to a first clock signal supply line, and a second electrode connected to the Q2 node; a seventh transistor including a first electrode connected to a gate high voltage supply line, a gate electrode connected to the start signal input terminal or the carry signal output terminal of the previous stage, and a second electrode connected to the QB2 node; and a third capacitor which is connected between the first clock signal supply line and the QB2 node.

The second node controller may include a fourth transistor including a first electrode connected to a gate high voltage supply line, a gate electrode connected to the Q2 node, and a second electrode connected to the QB1 node; a fifth transistor including a first electrode connected to a first clock signal supply line, a gate electrode connected to the QB2 node, and a second electrode connected to the QB1 node; a sixth transistor including a first electrode connected to the Q2 node, a gate electrode connected to a gate low voltage supply line, and a second electrode connected to the Q1 node; and a second capacitor which is connected between the gate high voltage supply line and the QB1 node.

The third node controller may include a tenth transistor including a first electrode connected to the Q1 node, a gate electrode connected to a first clock signal supply line, and a second electrode connected to the Q node; an eleventh transistor including a first electrode connected to the QB1 node, a gate electrode connected to the first clock signal supply line, and a second electrode connected to the QB node; a twelfth transistor including a first electrode connected to the gate low voltage supply line, a gate electrode connected to a second clock signal supply line, and a second electrode connected to the Q node; and a thirteenth transistor including a first electrode connected to a gate high voltage supply line, a gate electrode connected to the second clock signal supply line, and a second electrode connected to the QB node.

At a time when the first clock signal is toggled from a high level to a low level, the scan signal is toggled from a low level to a high level and at a time when the second clock signal is toggled from a high level to a low level, the scan signal may be toggled from a high level to a low level.

At a time when the first clock signal is toggled from a high level to a low level, the carry signal may be toggled.

A plurality of transistors included in each of the plurality of stages may be p-type transistors.

In order to achieve the objects as described above, according to an aspect of the present disclosure, a display device may include a display panel including an active area in which a plurality of pixels is disposed; and a gate driver including a plurality of stages which is dependently connected to each other, each of the plurality of stages may include: a node controller configured to control voltages of a Q node, a Q1 node, a Q2 node, a QB node, a QB1 node, and a QB2 node based on a first clock signal and a second clock signal; a carry signal output unit configured to output a carry signal to a next stage based on the voltages of the Q1 node and the QB1 node; and a scan signal output unit configured to output a scan signal to a scan line based on the voltages of the Q node and the QB node, and a width of the scan signal may be determined by a toggling timing of the first clock signal and a toggling timing of the second clock signal.

The scan signal output unit may include a first transistor including a first electrode connected to a gate low voltage supply line, a gate electrode connected to the Q node, and a second electrode connected to a scan signal output terminal, a second transistor including a first electrode connected to a gate high voltage supply line, a gate electrode connected to the QB node, and a second electrode connected to the scan signal output terminal; and a first capacitor which is connected between the gate electrode and the second electrode of the first transistor.

The carry signal output unit may include an eighth transistor including a first electrode connected to a gate low voltage supply line, a gate electrode connected to the Q1 node, and a second electrode connected to a carry signal output terminal; a ninth transistor including a first electrode connected to a gate high voltage supply line, a gate electrode connected to the QB1 node, and a second electrode connected to the carry signal output terminal; a fourth capacitor connected between the gate electrode and the second electrode of the eighth transistor; and a fifth capacitor which is connected between the gate low voltage supply line and the carry signal output terminal.

The node controller may include a first node controller configured to control the Q2 node and the QB2 node; a second node controller configured to control the Q1 node and the QB1 node; and a third node controller configured to control the Q node and the QB node.

The first node controller may include a third transistor including a first electrode connected to a start signal input terminal or a carry signal output terminal of a previous stage, a gate electrode connected to a first clock signal supply line, and a second electrode connected to the Q2 node; a seventh transistor including a first electrode connected to a gate high voltage supply line, a gate electrode connected to the start signal input terminal or the carry signal output terminal of the previous stage, and a second electrode connected to the QB2 node; and a third capacitor which is connected between the first clock signal supply line and the QB2 node.

The second node controller may include a fourth transistor including a first electrode connected to a gate high voltage supply line, a gate electrode connected to the Q2 node, and a second electrode connected to the QB1 node; a fifth transistor including a first electrode connected to a first clock signal supply line, a gate electrode connected to the QB2 node, and a second electrode connected to the QB1 node; a sixth transistor including a first electrode connected to the Q2 node, a gate electrode connected to a gate low voltage supply line, and a second electrode connected to the Q1 node; and a second capacitor which is connected between the gate high voltage supply line and the QB1 node.

The third node controller may include a tenth transistor including a first electrode connected to the Q1 node, a gate electrode connected to a first clock signal supply line, and a second electrode connected to the Q node; an eleventh transistor including a first electrode connected to the QB1 node, a gate electrode connected to the first clock signal supply line, and a second electrode connected to the QB node; a twelfth transistor including a first electrode connected to a gate low voltage supply line, a gate electrode connected to a second clock signal supply line, and a second electrode connected to the Q node; and a thirteenth transistor including a first electrode connected to a gate high voltage supply line, a gate electrode connected to the second clock signal supply line, and a second electrode connected to the QB node.

Each of the plurality of pixels may include both a p-type transistor and an n-type transistor.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope of the present disclosure should be construed as falling within the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver, comprising:

a plurality of stages which are connected to one another, wherein each of the plurality of stages includes:

a node controller configured to control voltages of a Q node, a Q1 node, a Q2 node, a QB node, a QB1 node, and a QB2 node based on a first clock signal and a second clock signal;

a carry signal output unit configured to output a carry signal to a next stage based on the voltages of the Q1 node and the QB1 node; and a scan signal output unit configured to output a scan signal to a scan line based on the voltages of the Q node and the QB node, wherein a width of the scan signal is determined by a toggling timing of the first clock signal and a toggling timing of the second clock signal, wherein the carry signal output unit includes:

an eighth transistor including a first electrode connected to a gate low voltage supply line, a gate electrode connected to the Q1 node, and a second electrode connected to a carry signal output terminal; and a ninth transistor including a first electrode connected to a gate high voltage supply line, a gate electrode connected to the QB1 node, and a second electrode connected to the carry signal output terminal; and wherein the carry signal output unit further includes:

a fourth capacitor which is connected between the gate electrode and the second electrode of the eighth transistor; and a fifth capacitor which is connected between the gate low voltage supply line and the carry signal output terminal.

2. The gate driver according to claim 1, wherein the scan signal output unit includes:

a first transistor including a first electrode connected to a gate low voltage supply line, a gate electrode connected to the Q node, and a second electrode connected to a scan signal output terminal;

a second transistor including a first electrode connected to a gate high voltage supply line, a gate electrode connected to the QB node, and a second electrode connected to the scan signal output terminal; and a first capacitor connected between the gate electrode and the second electrode of the first transistor.

3. The gate driver according to claim 2, wherein when the second clock signal is toggled from a high level to a low level, the first capacitor is configured to bootstrap the Q node.

4. The gate driver according to claim 1, wherein when the first clock signal is toggled from a high level to a low level, the fourth capacitor is configured to bootstrap the Q1 node.

5. The gate driver according to claim 1, wherein the node controller includes:

a first node controller configured to control the Q2 node and the QB2 node;

a second node controller configured to control the Q1 node and the QB1 node; and a third node controller configured to control the Q node and the QB node.

6. The gate driver according to claim 5, wherein the first node controller includes:

a third transistor including a first electrode connected to a start signal input terminal or a carry signal output terminal of a previous stage, a gate electrode connected to a first clock signal supply line, and a second electrode connected to the Q2 node;

a seventh transistor including a first electrode connected to a gate high voltage supply line, a gate electrode connected to the start signal input terminal or the carry signal output terminal of the previous stage, and a second electrode connected to the QB2 node; and a third capacitor which is connected between the first clock signal supply line and the QB2 node.

7. The gate driver according to claim 5, wherein the second node controller includes:

a fourth transistor including a first electrode connected to a gate high voltage supply line, a gate electrode connected to the Q2 node, and a second electrode connected to the QB1 node;

a fifth transistor including a first electrode connected to a first clock signal supply line, a gate electrode connected to the QB2 node, and a second electrode connected to the QB1 node;

a sixth transistor including a first electrode connected to the Q2 node, a gate electrode connected to a gate low voltage supply line, and a second electrode connected to the Q1 node; and a second capacitor which is connected between the gate high voltage supply line and the QB1 node.

8. The gate driver according to claim 5, wherein the third node controller includes:

a tenth transistor including a first electrode connected to the Q1 node, a gate electrode connected to a first clock signal supply line, and a second electrode connected to the Q node;

an eleventh transistor including a first electrode connected to the QB1 node, a gate electrode connected to the first clock signal supply line, and a second electrode connected to the QB node;

a twelfth transistor including a first electrode connected to the gate low voltage supply line, a gate electrode connected to a second clock signal supply line, and a second electrode connected to the Q node; and a thirteenth transistor including a first electrode connected to a gate high voltage supply line, a gate electrode connected to the second clock signal supply line, and a second electrode connected to the QB node.

9. The gate driver according to claim 1, wherein when the first clock signal is toggled from a high level to a low level, the scan signal is toggled from a low level to a high level, and when the second clock signal is toggled from a high level to a low level, the scan signal is toggled from a high level to a low level.

10. The gate driver according to claim 1, wherein when the first clock signal is toggled from a high level to a low level, the carry signal is toggled.

11. The gate driver according to claim 1, wherein a plurality of transistors included in each of the plurality of stages is p-type transistors.

12. A display device, comprising:

a display panel including an active area in which a plurality of pixels is disposed; and a gate driver including a plurality of stages which are connected to one another, wherein each of the plurality of stages includes:

a node controller configured to control voltages of a Q node, a Q1 node, a Q2 node, a QB node, a QB1 node, and a QB2 node based on a first clock signal and a second clock signal;

a carry signal output unit configured to output a carry signal to a next stage based on the voltages of the Q1 node and the QB1 node; and a scan signal output unit configured to output a scan signal to a scan line based on the voltages of the Q node and the QB node, wherein a width of the scan signal is determined by a toggling timing of the first clock signal and a toggling timing of the second clock signal, wherein the carry signal output unit includes:

an eighth transistor including a first electrode connected to a gate low voltage supply line, a gate electrode connected to the Q1 node, and a second electrode connected to a carry signal output terminal; and a ninth transistor including a first electrode connected to a gate high voltage supply line, a gate electrode connected to the QB1 node, and a second electrode connected to the carry signal output terminal, and wherein the carry signal output unit further includes:

a fourth capacitor connected between the gate electrode and the second electrode of the eighth transistor; and a fifth capacitor which is connected between the gate low voltage supply line and the carry signal output terminal.

13. The display device according to claim 12, wherein the scan signal output unit includes:

a first transistor including a first electrode connected to a gate low voltage supply line, a gate electrode connected to the Q node, and a second electrode connected to a scan signal output terminal;

a second transistor including a first electrode connected to a gate high voltage supply line, a gate electrode connected to the QB node, and a second electrode connected to the scan signal output terminal; and a first capacitor which is connected between the gate electrode and the second electrode of the first transistor.

14. The display device according to claim 12, wherein the node controller includes:

a first node controller configured to control the Q2 node and the QB2 node;

a second node controller configured to control the Q1 node and the QB1 node; and a third node controller configured to control the Q node and the QB node.

15. The display device according to claim 14, wherein the first node controller includes:

a third transistor including a first electrode connected to a start signal input terminal or a carry signal output terminal of a previous stage, a gate electrode connected to a first clock signal supply line, and a second electrode connected to the Q2 node;

a seventh transistor including a first electrode connected to a gate high voltage supply line, a gate electrode connected to the start signal input terminal or the carry signal output terminal of the previous stage, and a second electrode connected to the QB2 node; and a third capacitor which is connected between the first clock signal supply line and the QB2 node.

16. The display device according to claim 14, wherein the second node controller includes:

a fourth transistor including a first electrode connected to a gate high voltage supply line, a gate electrode connected to the Q2 node, and a second electrode connected to the QB1 node;

a fifth transistor including a first electrode connected to a first clock signal supply line, a gate electrode connected to the QB2 node, and a second electrode connected to the QB1 node;

a sixth transistor including a first electrode connected to the Q2 node, a gate electrode connected to a gate low voltage supply line, and a second electrode connected to the Q1 node; and a second capacitor which is connected between the gate high voltage supply line and the QB1 node.

17. The display device according to claim 14, wherein the third node controller includes:

a tenth transistor including a first electrode connected to the Q1 node, a gate electrode connected to a first clock signal supply line, and a second electrode connected to the Q node;

an eleventh transistor including a first electrode connected to the QB1 node, a gate electrode connected to the first clock signal supply line, and a second electrode connected to the QB node;

a twelfth transistor including a first electrode connected to a gate low voltage supply line, a gate electrode connected to a second clock signal supply line, and a second electrode connected to the Q node; and a thirteenth transistor including a first electrode connected to a gate high voltage supply line, a gate electrode connected to the second clock signal supply line, and a second electrode connected to the QB node.

18. The display device according to claim 14, wherein each of the plurality of pixels includes both a p-type transistor and an n-type transistor.

* * * * *